US011878304B2

(12) United States Patent
Knoppke et al.

(10) Patent No.: US 11,878,304 B2
(45) Date of Patent: Jan. 23, 2024

(54) RECEIVING FRAME FOR RECEIVING A SUPPORT PLATE FOR PIPETTE TIPS

(71) Applicant: TECAN TRADING AG, Mannedorf (CH)

(72) Inventors: Marina Knoppke, Wetzikon (CH); Sven Pflumm, Mannedorf (CH); Claudio Bohli, Winterthur (CH)

(73) Assignee: TECAN TRADING AG, Mannedorf (CH)

( * ) Notice: Subject to any disclaimer, the term of this patent is extended or adjusted under 35 U.S.C. 154(b) by 106 days.

(21) Appl. No.: 17/558,764

(22) Filed: Dec. 22, 2021

(65) Prior Publication Data

US 2022/0193684 A1 Jun. 23, 2022

(30) Foreign Application Priority Data

Dec. 23, 2020 (EP) .................................... 20216953

(51) Int. Cl.
*B01L 9/00* (2006.01)

(52) U.S. Cl.
CPC ........... *B01L 9/543* (2013.01); *B01L 2200/08* (2013.01); *B01L 2200/12* (2013.01); *B01L 2300/12* (2013.01)

(58) Field of Classification Search
None
See application file for complete search history.

(56) References Cited

U.S. PATENT DOCUMENTS

| | | | | |
|---|---|---|---|---|
| 5,642,816 | A * | 7/1997 | Kelly | B01L 9/543 211/74 |
| 6,098,819 | A * | 8/2000 | Link | B01L 9/543 422/561 |
| 2008/0031781 | A1 | 2/2008 | Rasnow et al. | |
| 2010/0266457 | A1 * | 10/2010 | Rethwisch | B01L 9/543 422/511 |
| 2012/0328489 | A1 | 12/2012 | Beese et al. | |
| 2019/0299217 | A1 | 10/2019 | Motadel et al. | |

FOREIGN PATENT DOCUMENTS

| | | | |
|---|---|---|---|
| DE | 19742493 | C1 | 2/1999 |
| EP | 3320975 | A1 | 5/2018 |
| WO | 9715215 | A1 | 5/1997 |

* cited by examiner

*Primary Examiner* — Paul S Hyun
(74) *Attorney, Agent, or Firm* — Notaro, Michalos & Zaccaria P.C.

(57) ABSTRACT

A receiving frame for a support plate for pipette tips that is formed from two opposing longitudinal walls and two opposing transverse walls, each has an upper side and a lower side and laterally enclose an interior space is disclosed. The upper sides of the longitudinal walls and transverse walls together form a circumferential support surface on which a support plate for pipette tips can be reversibly placed. The receiving frame has a footprint on the lower side of the longitudinal walls and the transverse walls.

15 Claims, 15 Drawing Sheets

RECEIVING FRAME FOR RECEIVING A SUPPORT PLATE FOR PIPETTE TIPS

RELATED APPLICATION

This patent application claims priority of the European patent application number EP 20216953.8, filed on Dec. 23, 2020, which is incorporated by reference in its entirety herein.

FIELD OF THE INVENTION

The present invention relates to a receiving frame for receiving a support plate for pipette tips. A corresponding receiving frame is formed from two opposing longitudinal walls and two opposing transverse walls, which each comprise an upper side and a lower side and laterally enclose an interior space. The upper sides of the longitudinal walls and transverse walls together form a circumferential support surface on which a support plate for pipette tips can be placed. On the lower side of the longitudinal walls and the transverse walls, the receiving frame comprises a footprint. The present invention further relates to a method for presenting pipette tips, for which purpose a corresponding receiving frame is presented.

DESCRIPTION OF THE PRIOR ART

In laboratories in particular, work is frequently carried out with liquids using one or more pipettes, wherein pipette tips are frequently used for direct contact with the liquid, which are discarded after use with the liquid. In addition to such disposable pipette tips, which are generally made of plastic, metal cannulas are also known to be used as pipette tips which are cleaned when the liquid or sample is changed in between. The disposable pipette tips are usually placed or plugged onto a designated end of a pipette, for example a hand pipette or a pipetting head used in automation, whereas metal cannulas are more likely to be screwed.

For a simplified setting-up, pipette tips are often presented by means of a storage box for the corresponding pipette, in which they can also be stored. It has become established practice to arrange the pipette tips in a standardized matrix, for example in an 8×12 matrix. This format corresponds to the arrangement of wells in a standard 96 well microplate. Also known is an arrangement of 384 pipette tips in a 16×24 matrix. Such standardized arrangements of receiving openings for pipette tips correspond to the format of standardized microplates in which the sample vessels, the so-called wells, are arranged in, for example, a 16×24 format. The pipette tips presented in each case are particularly suitable for use with a microplate of an analog format.

Standardized microplates comply with the standards according to ANSI_SLAS_1-4 2004 of the American National Standards Institute, 2004, with which size, dimensions, etc. are specified. For example, 96-well microplates have 8×12 wells with a center distance of 9 mm each, while the corresponding center distance for 384-well microplates is 4.5 mm each. Also, the base or footprint of the microplate is always the same for different plate types according to the above-mentioned standard, so that regardless of the type and number of wells in the microplate, the same place is possible in each case, for example on the work surface of an automatic pipetting machine. Finally, it is also specified that the arrangement of the wells themselves relative to the base surface of the microplate is standardized. Accordingly, the "hole pattern" of the wells is always in the same place compared to the footprint; moreover, standardized microplates can be said to be point-symmetrical. This standardized geometry makes the use of such microplates in automation particularly advantageous.

Especially in the field of automation, it has proven advantageous that storage boxes for pipette tips also correspond to the standard of microplates not only in the arrangement of the storage openings for pipette tips, but also in the sizes and dimensions of their footprint and in the arrangement of the storage openings in relation to the footprint.

It may be provided to store the pipette tips in a simple tray, i.e. a support plate, instead of in a storage box. Several support plates can then be stacked on top of each other with inserted pipette tips to save space, which is particularly advantageous for shipping or storage. For use, a support plate fitted with pipette tips can then be placed on an appropriately shaped receiving frame.

The use of such support plates has the advantage that the respective pipette tips can not only be standardized, but also stored and presented in a space-saving manner, while the associated receiving frame can be adapted to other conditions.

For example, it may be provided that the receiving frame comprises a standard footprint of a standard microplate as mentioned above. Such receiving frames are hereinafter also referred to as ANSI/SLAS frames. Known, for example, is the "DiTi Box, LiHa, empty, ANSI Format" of the applicant, available under order number 30058506 or 30058507. Alternatively, however, the receiving frame may have a deviating shape or a deviating footprint. A receiving frame can be designed with or without a base, wherein a frame with a base can also be referred to as a box.

In addition to the use of the standard with regard to the footprint, the positioning of the arrangement of the storage openings for pipette tips (their hole pattern) in relation to the footprint of the receiving frame can also be adapted to the standard of microplates. Thus, a point-symmetrical geometry of the hole pattern of the support plate and its geometry in relation to the footprint of the receiving frame is also advantageous in automation. However, such geometries have not always been applied in the past. Various manufacturers of automated pipetting systems, for example, offer receiving frames that are specially adapted and optimized to the conditions and space requirements of their automated pipetting systems. There are differences not only with regard to the shape of the footprint, but also, for example, with regard to engagement surfaces for robot grippers, a desired degree of fixation of the support plate on the frame (e.g. with or without snap-in function), special geometries of pipette tips to be used or directional structures on the receiving frame, or the like.

Known, for example, is the frame "Deck Runner, Nest, FCA DiTi Tray, 4-Position", Tecan Order No. 30042739. This frame has, for example, a standardized footprint, but is individually adapted with respect to the fixation of a support plate, so that the hole pattern of the storage openings in the support plate is offset with respect to the footprint compared to the standard for microplates, and no point-symmetrical geometry results with the footprint.

However, such individualized adaptation leads to the fact that only a certain type of support plate fits on a certain type of receiving frame, which limits, for example, the flexibility in the configuration of an automated process, since recourse must be made to a large number of different support plates and receiving frames. Furthermore, although a standardization of the footprint can be realized, for example, the positioning of the "hole pattern of the receiving openings" of the support plate relative to the footprint deviates from the standardized position of the hole pattern of microplates, which can also prove difficult in the realization of an automated process.

SUMMARY OF THE INVENTION

It is an object of the present invention to provide a receiving frame which can be used universally, i.e. compatibly, for certain pipette tip support plates.

The object is solved by providing a receiving frame for receiving a support plate for pipette tips according to the features of claim 1.

The provided receiving frame for a support plate for pipette tips is formed by two opposite longitudinal walls and two opposite transverse walls, which each comprise an upper side and a lower side and which laterally enclose an interior space. The upper sides of the longitudinal walls and transverse walls together form a circumferential support surface on which a support plate for pipette tips can be placed. In addition, the receiving frame comprises a footprint on the lower side of the longitudinal walls and the transverse walls.

The receiving frame further comprises a guide claw on at least one longitudinal wall for alternatively positioning two different support plates on the support surface. This guide claw projects beyond the support surface and the receiving frame.

The support surface in combination with the guide claw are designed in such a way that the receiving frame can support (or bear, respectively) at least two different support plates for pipette tips known per se from the prior art. For this purpose, it is not necessary that the entire support surface is occupied by the respective support plate placed thereon. However, it is provided that the support surface is sufficiently large and sufficiently shaped that an attached support plate rests on the receiving frame as wobble-free as possible, so that it cannot tilt on the receiving frame into different positions, but rests in a flat manner. The longitudinal and transverse walls therefore close off as flatly as possible with their upper sides, so that the support surface extends essentially along a plane which can be acted upon flatly by a support plate.

In particular, it may be provided that the receiving frame is designed to reversibly support the two support plates for pipette tips. In this case, the acting forces of elements provided for positioning and possibly loosely holding one and/or the other support plate on the receiving frame can be manually counteracted by a user or a common robot gripper in such a way that the respective support plate can be effortlessly lifted off the receiving frame again. Any existing interactions between elements of the receiving frame and the support plate can be released again effortlessly.

In the context of the present invention, the term "upper side" refers to the upper surface of the longitudinal and transverse walls, respectively, when the receiving frame is placed on a surface. This upper side thus forms a planar termination of the receiving frame at its upper end. According to the invention, the upper region of the receiving frame has additional features to enable at least two different support plates for pipette tips to be placed on the upper surface in a reversible and preferably wobble-free manner.

Similarly, the term "lower side" in the context of the present invention refers to the lower surface of the longitudinal and transverse walls, respectively, with which the receiving frame can be placed on a work surface. This lower side thus forms a planar termination of the receiving frame at its lower end.

"Different support plates" are understood to mean pipette tip support plates which have different geometries as adaptations to individually formed receiving frames. Such adaptations may, for example, relate in particular to the support surface of the support plate, engagement elements or guide- or orientation-elements for interacting with complementary elements on the corresponding receiving frame.

Common to variously configured pipette tip support plates is a base plate having a plurality of storage openings which penetrate the base plate and are arranged in a particular array. The base plate forms a matrix in which the storage openings are embedded and arranged. In essence, the dimensions of base plates of different support plates are similar with respect to their plan view, while the number of storage openings, the thickness of the base plate and the outer contour may differ. Thus, as in the case of standardized microplates, 8×12 or 16×24 storage openings may be embedded in the same base area. Due to the standardized arrangement of the storage openings and their adherence to standards for microplates, similar base plate geometries result despite the different number of storage openings.

It is typically provided that a pipette tip is inserted into a storage opening and held there, for example by means of a collar at the upper end of the pipette tip. Common arrays of storage openings comprise, for example, an 8×12 arrangement in which 96 pipette tips are stored in a standardized manner; however, arrays 16×24 for 384 pipette tips, 32×48 storage openings for 1536 pipette tips, etc. are also possible, for example.

Due to the appropriate dimension of the storage opening, a support plate can store disposable pipette tips of different volumes, for example for 1000 μL, 500 μL, 350 μL, 200 μL, 50 μL or 10 μL liquid. As mentioned above, the storage openings are arranged in an array corresponding to the array of wells of a standard microplate.

As soon as a support plate for pipette tips is adapted for a specific embodiment of a receiving frame or a receiving box, such support plates have individual connecting or retaining structures. Such individually adapted support plates are necessary, for example, when a receiving frame or a receiving box is adapted to device-typical or application-typical conditions. Conversely, a support plate for pipette tips may be adapted to device-typical or application-typical requirements, which in turn requires individual solutions for the correspondingly assigned receiving frame. Individually adapted support plates for pipette tips or standardized support plates for pipette tips cannot usually be placed interchangeably on the respective, assigned receiving frames or holding boxes.

A circumferential support surface of the receiving frame refers to the surface formed jointly by the upper sides of the longitudinal and transverse walls. It supports, or bears, respectively, a support plate for pipette tips placed on the receiving frame, as already mentioned.

It can be provided that not the entire support surface is covered by the respective attached support plate for pipette tips. Rather, the same, but also different regions of the support surface can be occupied by the respective support plates by adapting the geometry of the support surface to the support plates.

The footprint, in the context of the present invention, means the surface with which the receiving frame can be placed on a work surface. It is possible that the footprint is formed by the lower sides of the longitudinal and transverse walls themselves. However, it is also possible that the footprint is formed by, for example, an additional bottom adjoining the lower sides of the longitudinal and transverse walls, as will be discussed later.

It may be provided that the footprint is dimensionally equivalent to the footprint of a standard microplate. This allows for their simplified use on automated laboratory equipment configured for the use of standard microplates.

The longitudinal and transverse walls each have a height which extends from the upper side to the lower side of the corresponding longitudinal or transverse wall. It may be provided that the height of the longitudinal and transverse walls is adapted to the length of the pipette tips to be used, in order to optimally accommodate the respective pipette tips which protrude into the interior space of the receiving frame by means of a support plate placed on the receiving frame. For example, it may be provided that for long pipette tips, such as 1000 μL tips, the longitudinal and transverse walls are higher than, for example, for pipette tips with a 10 μL receiving volume. In embodiments without a base, the height of the longitudinal and transverse walls is substantially the same as the height of the receiving frame. In embodiments with a base, the thickness of the base may additionally influence the height of the frame.

The longitudinal and transverse walls have an inner side facing the interior and a corresponding outer side. It is provided that the longitudinal and transverse walls are formed continuously at least at their upper side, and thus form a continuous, circumferential support surface. Moreover, the longitudinal and transverse walls may be formed in a continuous planar manner along their height, but it may also be possible for them to have recesses along their height.

According to the invention, the receiving frame comprises a guide claw which serves as a first connecting element for support plate placed on. In this respect, it is configured to serve as a connecting element both for a support plate of a first embodiment and for a support plate of a second embodiment, with the function being performed in different ways in each case:

If a pipette tip support plate of a first embodiment is placed on the receiving frame according to the invention, the guide claw can engage in a corresponding reinforcing strut on the lower side of this support plate of the first embodiment due to its positioning on the longitudinal wall of the receiving frame and due to its projecting beyond the upper side thereof. In this way, the guide claw can additionally guide the support plate of the first embodiment into a desired position.

This function is performed in an alternative manner in an alternative pipette tip support plate of a second embodiment, which does not have a corresponding reinforcing strut but has a lateral recess, in that the guide claw is inserted into this lateral recess and projects out through it. Also in this way, the guide claw can perform a guiding function also in connection with the pipette tip support plate of the second embodiment.

Such a guiding function is thus implemented differently depending on the type of pipette tip support plate placed on.

Furthermore, it may be provided that the guiding claw has an optional retaining function if it is suitably configured, as described in more detail below. In this case, it is provided that in addition to guiding, it retainingly engages the reinforcing strut of the pipette tip support plate of the first embodiment, or, in the case of the pipette tip support plate of the second embodiment, it is not only guided through the lateral recess, but additionally retainingly engages the lateral recess.

Support plates for pipette tips are known per se from the prior art. In particular, it is provided that the receiving frame according to the invention is designed to receive in particular the following two types of support plates:

A support plate for pipette tips of the first embodiment can be purchased as an SBS standard support plate. It is sold as a "Refill Insert" with different disposable tip sizes by the applicant (for example "LiHa, ANSI, 10 μL", order no. "LiHa, ANSI, 200 μL", order no. 30057814, "LiHa, ANSI, 200 μL", order no. 30057814 or example "LiHa, ANSI, 10 μL", order no. "LiHa, ANSI, 1000 μL", order no. 30057816.

A support plate for pipette tips of the second embodiment is a support plate from Tecan, available under order no. 30104803 (LiHa, hanging tip format, 10 μL), 30000627 (LiHa, hanging tip format, 200 μL) or 30000630 (LiHa, hanging tip format, 1000 μL).

Common to the support plates of the first and second embodiments is only the arrangement and dimension of the storage openings (10, 30) for storing pipette tips in the base plate, which are arranged as standard in both embodiments. For example, a common format is the aforementioned 8×12 arrangement for 96 pipette tips.

Due to the standardized arrangement and dimensioning of the storage openings, the respective base plates of both support plates have a similar, if not identical basic geometry and basic symmetry with regard to the storage openings and their grid. Nevertheless, it has not yet been possible to place one of the support plates in each case on the receiving frame which is adapted for the other support plate. This is due, for example, to the different structures surrounding the storage openings or the base plate, which are necessary for positioning the respective support plate on its associated receiving frame, but which lead to greater deviations in the geometries of the support plates. Such variations result in the support plates being positioned differently on the frame with respect to the position of their "hole pattern" relative to the footprint of that frame. For example, the support plate of the first embodiment is positioned point-symmetrically with respect to the footprint of its receiving frame, whereas the support plate of the second embodiment with its hole pattern is not positioned point-symmetrically with respect to the footprint, but only axially symmetrically with respect to its horizontal axis on the receiving frame.

The following aspects also have an influence on the positionability of the support plate:

For example, a pipette tip support plate of the first embodiment has a relatively thick base plate and, as a circumferential structure, a lower support surface with which it rests on its receiving box and also on the receiving frame according to the invention. This support surface is spaced from the base plate by a plurality of reinforcing struts, wherein a lower side of the reinforcing struts terminates in the same plane as the lower support surface and can thus also form part of the lower support surface. The base plate is configured to be thick enough to protrude into the interior space of the receiving frame according to the invention, such that possible inner webs, as will be discussed later, protrude close enough to the base plate to guide it into a desired position in the x-y direction. In addition, a centering opening is provided in each of the four corners, in which corresponding centering pins of the receiving box adapted thereto engage. Due to the geometry of the receiving frame according to the invention, the centering openings do not assume any function in connection with this receiving frame.

A pipette tip support plate of the second embodiment, on the other hand, has a thinner base plate and, as its lower side, a continuous, circumferential surface with which the support plate is placed on a corresponding receiving box. In the mounted state, the base plate of this support plate of the second embodiment therefore projects less far into the interior space of the receiving frame according to the invention. On a transverse side, this support plate has an orientation web which projects from the lower side and forms an orientation channel towards the base plate.

In one embodiment of the invention, which may be combined with any other embodiment mentioned above or yet to be mentioned, provided they do not contradict each other, the guide claw comprises two claws which are spaced apart from each other in the direction of the longitudinal wall by a guide. In this case, the guide is designed as a recess which, starting from an upper side of the claw which projects beyond the receiving frame, extends essentially at a right angle to the support surface as far as at least this support surface.

The guide between the claws allows that when the guide claw engages a reinforcing strut of the pipette tip support plate of the first embodiment, a reversibly releasable frictional connection is created between the guide claw (in particular the guide) and the reinforcing strut, and the latter is thus loosely held on the receiving frame by the guide claw.

It is provided that at least one of the claws, preferably both claws, protrudes beyond the upper side of the longitudinal wall to which it is attached. In this case, the two claws of the guide claw can be seated on a common base, wherein this base itself can be almost completely connected to the inner side of the longitudinal wall. Thus, a spring effect may be formed which is influenced by the length of the guide claw itself, the length of the claw(s) and/or the thickness thereof and/or the length of the guide. For an increase of the spring effect, it may be provided that also the base extends over a length along the inner side of the longitudinal wall without being directly connected thereto.

The protruding claw, when a pipette tip support plate of the second embodiment is placed on the receiving frame, can enter a lateral recess provided longitudinally in those structures which surround the base plate with the storage openings.

A support plate for pipette tips of the first embodiment does not have one or more such longitudinally present recesses through which the two claws can project when placed. This support plate is formed continuously in the analogous regions and has a reinforcing strut on its lower side. The receiving frame according to the invention makes use of a thicker base plate of the support plate of the first embodiment, in that the guide claw is dimensioned and positioned in such a way that the reinforcing strut enters the guide between the claws of the guide claw when it is placed on the receiving frame. The claws thereby travel past the corresponding reinforcing strut. The recess thus spaces the two claws apart by a distance that allows the reinforcing strut to enter the recess with substantially no resistance.

Since the recess—starting from the upper side of the claws, which protrudes beyond the receiving frame—extends in the direction of the interior space of the receiving frame at least as far as the support surface, it can be ensured that the reinforcing strut of the support plate for pipette tips of the second embodiment sinks into the recess during placement without hindering the wobble-free contact of the support plate with the support surface of the receiving frame. If the depth is insufficient, the stability of the support plate on the receiving frame would be determined by the contact between the reinforcing strut and the guide. Since only one guide claw is provided on one or both longitudinal sides of the receiving frame—the number and position of the guide claw is determined by the number and position of the lateral recess of the support plate of the first embodiment—a wobble-free support of the support plate of the second embodiment is not possible if the depth of the recess between the claws is insufficient. Rather, the elevated position relative to the support surface would mean that the plate would tilt, which would not allow, for example, automated pick-up of a pipette tip located in the support plate.

In one embodiment of the invention, which may be combined with any other embodiment previously mentioned or yet to be mentioned, provided that they do not contradict each other, the receiving frame comprises two guide claws, wherein one guide claw is arranged on each longitudinal wall, and wherein both guide claws face each other.

It is thereby provided that the guide claw is arranged centrally on the longitudinal walls, i.e. at the same distance from the two transverse walls. This position results from the position of the lateral recess in the pipette tip support plate of the second embodiment, through which a guide claw is passed in each case when it is placed on the receiving frame.

In one embodiment of the invention, which may be combined with any other embodiment previously mentioned or yet to be mentioned, provided that they do not contradict each other, one or both claws are pin-shaped for positioning a pipette tip support plate, or one or both claws comprise a hook structure for additional reversible holding of a pipette tip support plate.

The hook structure(s) of the claws allow a pipette tip support plate of the second embodiment to be held in place by the claws projecting slightly laterally beyond the lateral recess when the support plate is in place, thereby engaging an upper surface of the support plate. Due to the elongated design of the guide claw, the guide claw has a spring effect so that the claws can be automatically pushed away when the support plate is lifted off.

One or both claws of a guide claw may be formed as simple pins extending along the height of the longitudinal wall on which the respective claw is arranged. A claw in pin form has essentially a guiding or positioning function for both a pipette tip support plate of the first embodiment and a pipette tip support plate of the second embodiment.

Alternatively, it may be provided that one or both claws of a guide claw have a hook structure at the end facing away from the receiving frame. Preferably, the hook structure projects away from the claw or the inner wall in the direction of the interior space.

In one embodiment of the invention, which may be combined with any other embodiment previously mentioned or yet to be mentioned, provided that they do not contradict each other, the claws of a guide claw are attached to the inner side of the longitudinal wall via a common base, wherein the common base is spaced apart from the inner side of the longitudinal wall or wherein the common base is substantially connected to the inner side of the longitudinal wall.

In one embodiment of the invention, which may be combined with any other embodiment previously mentioned or yet to be mentioned, provided that they do not contradict each other, the receiving frame comprises a protrusion on at least one transverse wall, which protrusion comprises two guide slots. The guide slots are thereby arranged in alignment with one another, wherein the alignment extends parallel to the corresponding transverse wall.

It is provided that each of the two guide slots is formed as a recess in the protrusion extending from the upper side in the direction of the foot part. In this case, the guide slots arranged in alignment form a common receptacle which extends along the alignment and parallel to the corresponding transverse wall.

It may be provided that the protrusion is substantially U-shaped. In this case, it may be formed, for example, from two spacer webs extending parallel to the longitudinal walls and a transverse web extending between the spacer webs and parallel to the transverse wall. A guide slot is arranged on each spacer web.

However, it may also be provided that the protrusion has, for example, a shape deviating from a U-shape, for example the shape of a half ellipse, provided that the guide slots are arranged in alignment with each other.

The two guide slots of a protrusion, for example a U-shaped protrusion, together form a receptacle for an orientation web of a support plate for pipette tips of a second embodiment. The orientation web is thereby inserted into the guide slots of the receiving frame when the support plate of the second embodiment is placed on the receiving frame. The guide slots thereby extend at least deep enough in the direction of the base, so that the orientation web of the support plate for pipette tips of the second embodiment allows the flush placement of this support plate on the support surface of the receiving frame. The guide slots allow such an orientation web of the support plate of the second embodiment not to space the mounted support plate from the receiving frame, for example by resting on the support surface of the receiving frame, but to be recessed therein by retracting into the formed receptacle.

Since the support plate for pipette tips of the first embodiment does not have an orientation web of the same type, which could hinder the support on the receiving frame according to the invention, this support plate of the first embodiment can be placed flat on the support surface of the receiving frame, resting with its structures surrounding the base plate at least partially on the upper side of the transverse web of the U-shaped protrusion.

In one embodiment of the invention, which may be combined with any other embodiment previously mentioned or yet to be mentioned, provided that they do not contradict each other, each of the two transverse walls comprises a protrusion with two guide slots.

In this embodiment, the orientation of the support plate of the second embodiment in which it must be placed on the receiving frame is not dictated by the presence of the guide slots on one or the other transverse side. Instead, a pipette tip support plate of the second embodiment may be placed on the receiving frame in either orientation with respect to the longitudinal orientation.

In one embodiment of the invention, which may be combined with any other embodiment previously mentioned or yet to be mentioned, provided that they do not contradict each other, the protrusion is U-shaped and is formed by two spacer webs extending parallel to the longitudinal walls and a transverse web extending between the spacer webs and parallel to the transverse wall. A guide slot is arranged on each spacer web.

In one embodiment of the invention, which may be combined with any other embodiment mentioned above or yet to be mentioned, provided that they do not contradict each other, each of the longitudinal walls of the receiving frame comprises on its inner side an inner web, which comprises at least one retaining ridge arranged towards the upper side of the frame and projecting from the inner web towards the interior. The retaining ridge is configured to reversibly retain a retaining lug of an attached support plate for pipette tips of a first embodiment.

In addition to the guide claw, the retaining ridge can provide loose support for the receiving frame to carry an positioned support plate for pipette tips. This is particularly advantageous for automated picking up of pipette tips stored in the support plate. If, for example, long pipette tips are jammed in the storage opening of the support plate, the support plate of the pipette tips is not lifted off the receiving frame despite automated picking up of a pipette tip by a pipette of a pipetting robot, but is held on the receiving frame by the guide claw(s) and optional retaining ridges.

The interaction between a retaining lug on an inner web and the pipette tip support plate of the first embodiment is possible because the base plate of this support plate of the first embodiment is thicker and protrudes relatively far into the interior space of the receiving frame, when the situation is compared with that of the support plate of the second embodiment. In this case, the inner webs of the receiving frame also protrude into the interior to such an extent that the webs or their retaining ridges and the base plate or its retaining lug can easily contact each other. In contrast, the support plate of the second embodiment merely rests on the receiving frame according to the invention and, due to the thinner base plate, there is no contact between the web or its retaining ridge and its base plate.

The presence of inner webs in itself serves to stiffen the receiving frame. It may be provided that the receiving frame comprises a plurality of inner webs on the inner sides of the longitudinal walls and/or on the inner sides of the transverse walls, but which serve in particular to improve the dimensional stability of the receiving frame and do not comprise structure(s) interacting with an attached support plate for pipette tips. One or more inner webs with additional retaining structures for interacting, for example, with an attached support plate for pipette tips, such as the retaining ridge, can thus be the sole inner webs, or they can be present in addition to purely stabilizing inner webs.

It is provided that an inner web extends by a length from the upper side of the longitudinal or transverse wall towards the lower side. Although it may be provided that the inner web extends over the entire height of a longitudinal side, this is not obligatory. For example, it may be flush with the respective upper side, or it may be offset therefrom in the direction of the lower side. The same applies to the situation on the lower side.

An inner web also extends by a depth from the inner side of the longitudinal or transverse wall to which it is attached, towards the interior space of the receiving frame. It may be provided that an inner web has a continuous depth or, for example, has a depth varying along the height extension of the longitudinal wall.

The length of an inner web between the upper side and the lower side of its longitudinal wall, its depth by which it protrudes into the interior, and its thickness each have an influence on the stiffness of the receiving frame to be achieved, together with the number of inner webs used.

It may be provided that inner webs with retaining ridges are arranged symmetrically with respect to each other on the opposing inner sides of the longitudinal walls, i.e. are arranged opposite each other. However, a different arrangement of inner webs on the opposite longitudinal walls may also be provided, for example in order to have an influence on the stability of the support plate or in order to adapt the receiving frame to correspondingly complementary structures on the support plate to be placed thereon. For example, it may be provided that the inner webs of the two opposing longitudinal walls are spaced as far as possible from each other, as seen diagonally.

In particular, it is provided that the position of an inner web with a retaining ridge is adapted to the position of a retaining lug on the support plate for pipette tips of the first embodiment when this is placed on the receiving frame, in order to allow mutual interaction. It is provided that this retaining ridge of the receiving frame is non-functional with respect to a second, attached support plate.

In one embodiment of the invention, which may be combined with any other embodiment previously mentioned or yet to be mentioned, provided that they do not contradict each other, the receiving frame comprises on each longitudinal wall a respective guide claw and two inner webs each having a retaining ridge. In this case, one inner web is arranged on each side of the guide claw.

It may be provided that the guide claw is arranged centrally on the longitudinal walls, i.e. at the same distance from each of the two transverse walls. It may further be provided that the inner webs with retaining ridges are arranged on one longitudinal wall, in each case at the same distance from the guide claw of this longitudinal wall, or at different distances. It may also be provided that the inner webs with retaining ridges of opposite longitudinal walls are arranged mirror-symmetrically with respect to one another. By means of a symmetrical arrangement, for example, the stability with which a support plate for pipette tips is held on the receiving frame can be increased.

In one embodiment of the invention, which may be combined with any other embodiment previously mentioned or yet to be mentioned, provided that they do not contradict each other, at least one of the inner webs on each longitudinal wall is flush with the circumferential support surface.

It may be provided that a flush inner web forms part of the support surface for a pipette tip support plate. In this regard, the position of this inner web within the receiving frame may be selected such that one or both of the pipette tip support plates of the first or second embodiment discussed herein actually engage this inner web when placed on the receiving frame.

It may also be provided that inner webs without additional retaining structures are flush with the support surface and thus form part of the support surface, irrespective of whether inner webs with retaining structure are also flush or not. Furthermore, it may be provided that a part of the inner webs is flush, while another part is offset towards the upper side of the longitudinal walls and/or transverse walls in the direction of the lower side.

In the case where one or more inner webs form part of the support surface for support plates, it may be provided that the number and position of the inner webs is such that one or more of the inner webs engage a lower side of the support plate for pipette tips according to the second embodiment, and one or more of the inner webs are engaged by one or more reinforcing struts of the first support plate.

Provision may also be made for an inner web to form, for example, the base for the guide claw as previously discussed.

In one embodiment of the invention, which may be combined with any other embodiment previously mentioned or yet to be mentioned, provided that they do not contradict each other, the receiving frame comprises a U-shaped protrusion on both longitudinal walls.

A U-shaped protrusion can provide additional flexibility in accommodating the two different pipette tip support plates, and/or increase the length of the support surface for the two support plates.

It may be provided that a gripper edge is arranged on the outside of the U-shaped protrusion in each case, such as will be discussed further below.

In one embodiment of the invention, which may be combined with any other embodiment previously mentioned or yet to be mentioned, provided that they do not contradict each other, the receiving frame comprises inner webs on the inner side of the U-shaped protrusion.

It may be provided that all inner webs of the longitudinal walls are arranged at the respective U-shaped protrusion. For this purpose, it may be provided that the U-shaped protrusion extends over a major part of the length of the respective longitudinal wall. The inner webs may be flush with the support surface and thus form part thereof, or may be arranged offset relative to the support surface in a downward direction on the inner side of the longitudinal wall, as previously discussed. Likewise, a combination of inner webs arranged flush with and offset from the support surface is possible for each longitudinal wall.

In one embodiment of the invention, which may be combined with any other embodiment previously mentioned or yet to be mentioned, provided that they do not contradict each other, the receiving frame comprises a gripper edge on the longitudinal walls.

It may be provided that the gripper edge is a continuous surface on the outside of the longitudinal walls. For example, it may be offset from the rest of the outer surface of the longitudinal walls.

The gripper edge can, for example, be acted upon directly by a gripper with two gripper fingers. By laterally pressing the gripper fingers together, the receiving frame is then fixed in the gripper and can be carried to another position, for example. It may be provided that the gripper edge is arranged on the upper side of the respective longitudinal wall.

Alternatively, it may be provided that the gripper edge is formed as a web extending from the outside of the longitudinal wall away from the receiving frame, for example at a right angle to the longitudinal wall. Such a web may, for example, be gripped under by a gripper. By gripping underneath, the gripper can lift the receiving frame and reposition it accordingly. In this case, the gripper edge may be arranged at the upper side of the respective longitudinal side, or may be offset relative to the upper side in the direction of the lower side.

It may further be provided that the gripper edge comprises both a continuous surface on the outside for engaging a gripper and a web for gripping underneath a gripper. In this way, the receiving frame allows additional flexibility with respect to the grippers to be used.

In one embodiment of the invention, which may be combined with any other embodiment previously mentioned or yet to be mentioned, provided that they do not contradict each other, the receiving frame comprises a base plate connected to the longitudinal walls and/or the transverse walls.

In this embodiment, it may also be referred to as a receiving box instead of a receiving frame.

In one embodiment of the invention, which may be combined with any other embodiment previously mentioned or yet to be mentioned, provided that they do not contradict each other, the base plate forms a continuous surface which closes the receiving opening at the bottom of the frame and defines a footprint corresponding to a footprint of a standard microplate.

In one embodiment of the invention, which may be combined with any other embodiment previously mentioned or yet to be mentioned, provided they do not contradict each other, the base plate forms an interrupted surface.

In this embodiment, the outer shape of the frame in particular then determines the shape of the footprint.

For example, the interruptions in the base plate may be symmetrical or follow a pattern.

In one embodiment of the invention, which may be combined with any other embodiment previously mentioned or yet to be mentioned, provided that they do not contradict each other, the receiving frame comprises a dividing insert. This dividing insert itself comprises a plurality of dividing walls which form a plurality of receiving openings for pipette tips.

When a support plate, in which pipette tips are stored, is placed on a receiving frame according to the invention, the pipette tips protrude into the interior space of the receiving frame. For example, if the support plate is designed to store 96 pipette tips and is fully occupied when placed on the receiving frame, 96 pipette tips will accordingly protrude into the interior space of the receiving frame. In this situation, the pipette tips projecting into the interior space of the receiving frame may contact each other or, for example in the case of long pipette tips, jam when pulled out by a pipette. A dividing insert positioned in the interior space and having a plurality of receiving openings for pipette tips may serve to minimize or prevent such contacts or canting, respectively. This can play a role if, for example, pipette tips are used several times and it is to be prevented that different solutions, which are on adjacent pipette tips on their outside, are transferred between these pipette tips.

It may be provided that the dividing insert is adapted in its height, i.e. its extension from the base plate in the direction of the support surface, to the length of the part of a pipette tip projecting into the interior space of the receiving frame. It may further be provided that the height of the dividing insert is adapted as to whether, for example, substantially only the outlet end of a pipette tip protrudes into one of the receiving openings of the dividing insert, or, for example, the pipette tips protrudes into a receiving opening over almost the entire length of its part lying in the interior.

Accordingly, it may be provided that the dividing insert extends over almost the entire height of the receiving frame in the interior thereof. In this variant, however, it is not provided that a support plate placed on the receiving frame rests on or contacts such a dividing insert. Alternatively, it may be provided that the dividing insert extends over only part of the total internal height of the receiving frame, for example over the lower quarter, third or half.

The height of the interior space of the receiving frame, as discussed above, relates to the length along the extension between the bottom of one of the longitudinal walls or transverse walls and its corresponding top. Typically, each longitudinal wall and transverse wall of a receiving frame has the same height.

It may be provided that the dividing insert rests on the base plate of the receiving frame, if such a base plate is present. This may be a direct resting, or a resting, for example, on corresponding shoulders on the base plate.

Alternatively, it may be provided that the dividing insert is held above the base plate, for example, via the inner sides of the longitudinal and/or transverse walls. In this case, the presence of a base plate on the receiving frame is not mandatory. For example, the dividing insert may be dimensioned to be clamped directly between the longitudinal and/or transverse walls. It is also conceivable that the dividing insert and/or one or more inner sides comprise additional retaining structures for retaining the dividing insert in a clamping manner. The dividing insert would thus not necessarily have to be positioned in the lower region of the receiving frame, but could be held at a distance from the lower side of the receiving frame (between the lower side and the upper side of the receiving frame) as required.

In one embodiment of the invention, which may be combined with any other embodiment previously mentioned or yet to be mentioned, provided that they do not contradict each other, the receiving frame comprises a base plate which is connected to the lower sides of the longitudinal walls and/or the transverse walls of the receiving frame. The dividing insert rests on the base plate.

In one embodiment of the invention, which can be combined with any other embodiment mentioned above or yet to be mentioned, provided they do not contradict one another, the receiving frame comprises, on an inner side of the longitudinal wall or on an inner side of the transverse wall, an inner web which comprises a retaining ridge projecting in the direction of the interior. The retaining ridge is designed to act on the dividing insert in a reversible retaining manner.

In particular, it may be provided that the dividing insert comprises a retaining structure complementary to the one or more retaining ridges. For example, this may be one or more retaining ridges, analogous to the interaction of the retaining ridge and the retaining lug as discussed in connection with the support plate.

Reversible retaining in this context means that the retaining effect, as produced for example by the interaction of the retaining ridge and the retaining lug, can be reversed again, for example by applying a sufficiently large force. This "counterforce" can be exerted, for example, by a user pulling the dividing insert out of the receiving frame by hand.

It may be provided that the inner web with the retaining ridge for the dividing insert also comprises a retaining ridge for acting on a support plate to be placed thereon.

Alternatively, it may be provided that a retaining ridge for the dividing insert is arranged on a "separate" inner web independently of any retaining ridges that may be present.

Further, it may be provided that the receiving frame comprises more than one inner web having a retaining ridge for a dividing insert. For example, the receiving plate may comprise four such inner webs, two of which are arranged on the inner sides of each of the two opposing longitudinal walls.

In one embodiment of the invention, which may be combined with any other embodiment previously mentioned or yet to be mentioned, provided that they do not contradict each other, the dividing insert is formed of a plurality of dividing walls which form the receiving openings for pipette tips. A receiving opening formed by one or more dividing walls is thereby dimensioned for receiving one or more pipette tips.

It may be provided that the number and arrangement of the receiving openings of the dividing insert corresponds to the number and arrangement of storage openings of a support plate to be placed thereon. In this case, it is provided that for each pipette tip projecting into the interior space of the receiving frame, there is a receiving opening.

Alternatively, it may be provided that the arrangement of the receiving openings of the dividing insert is adapted to the number and arrangement of storage openings of a support plate to be placed thereon in such a way that several pipette tips can project into a formed receiving opening during normal use.

It may be provided that, for example, the dividing walls are longitudinal and transverse walls which extend substantially parallel to the longitudinal walls and transverse walls, respectively, of the receiving frame. However, the dividing walls may also have a different configuration to form the receiving openings of the dividing insert. For example, the dividing walls may also be formed as tubular hollow cylinders or parts thereof extending from the direction of the lower side of the receiving frame towards the upper side of the receiving frame. A portion of a tubular hollow cylinder may be, for example, a half hollow cylinder cut open in its longitudinal direction. A pipette tip may then extend into the respective hollow body, for example. In this case, the receiving opening would be formed directly by the hollow body. A receiving opening may alternatively be formed by a plurality of adjacent hollow cylinders, while the corresponding position of a pipette tip in this receiving opening is without its own hollow cylinder. In this regard, the hollow cylinders may have, for example, a circular base surface or a base surface deviating from a circular shape.

In one embodiment of the invention, which may be combined with any other embodiment previously mentioned or yet to be mentioned, provided that they do not contradict each other, the dividing walls are longitudinal and transverse walls which extend substantially parallel to the longitudinal walls or transverse walls. Alternatively, the dividing walls are hollow cylindrical bodies extending from the lower side of the receiving frame towards the upper side thereof.

In one embodiment of the invention, which may be combined with any other embodiment previously mentioned or yet to be mentioned, provided that they do not contradict each other, the receiving frame comprises at least one external fin. The at least one external fin is arranged at an outer side of a longitudinal wall and/or and outer side of a transverse wall, wherein the external fin ends flush with the support surface.

An external fin may be provided to confer additional stability to the frame. Whether an additional external fin is desired is for example depending on the forces with which pipettes are introduced into inserted pipette tips. Based on such parameter both the arrangement and the number of external fins may be chosen.

The receiving frame particularly preferably comprises four external fins, which are arranged in the outer corners. In this case the external fins are configured as corner fins, wherein in each case one corner fin is arranged at one outer corner of the receiving frame.

An outer corner of the receiving frame is understood being the location of the receiving frame where in each case one longitudinal wall and one transverse wall abut each other. It must not necessarily be a classical edge having an angle of 90 degree. The described location may rather be rounded, as it is exemplarily shown in the figures. It may however be particularly preferred that the external fin is arranged at an angle of 135 degree to the nearest longitudinal wall and to the corresponding nearest transverse wall.

It may be provided that the external fin extends in a manner along the height H of the receiving frame to end flush with the upper side of the corresponding longitudinal wall and the corresponding transverse wall. In such an embodiment of an external find, the upper side of the external fin is correspondingly part of the circumferential support surface. It may particularly extend over the complete height of the receiving frame. An outer find may in addition extend by a length away from the outer side of the receiving frame to be fully abutted by a support plate placed on.

Alternatively, the external fin may be offset towards the support surface or the upper side of the receiving frame. It may be particularly provided that the height of the external fin is adapted to the support plate for pipette tips to be placed on for providing an optimal support surface, where possible.

It may be provided that one or more external fins are produced in one piece with the receiving frame. In this case the external fins and the receiving frame are produced from the same material. Alternatively, it may be provided that one or more external fins are attached to the receiving frame subsequently. In this case one or more external fins may be produced from the same material or from another material. A material deviating from the material of the receiving frame may for example be chosen in case the external fins shall have an enhanced stiffness that the receiving frame.

The invention also relates to a method for presenting pipette tips. The method comprises the following steps:

- Providing a receiving frame in an embodiment as previously discussed;
- providing a pipette tip support plate of a first embodiment comprising at least one, preferably a plurality, of reinforcing struts on its lower side and a plurality of retaining lugs, and
- providing a support plate for pipette tips of a second embodiment comprising at least one, preferably two, recesses on its longitudinal side,
- selecting either the pipette tip support plate of the first embodiment or the pipette tip support plate of the second embodiment, and
- positioning and holding of the selected support plate for pipette tips on the receiving frame by means of the guide claw.

BRIEF DESCRIPTION OF THE FIGURES

The present invention will be explained in more detail with reference to the following figures (FIG.). The figures are for illustrative purposes only and are not to be construed as limiting.

The drawings show in each case in highly schematized form.

DETAILED DESCRIPTION OF THE FIGURES

Figure 1:
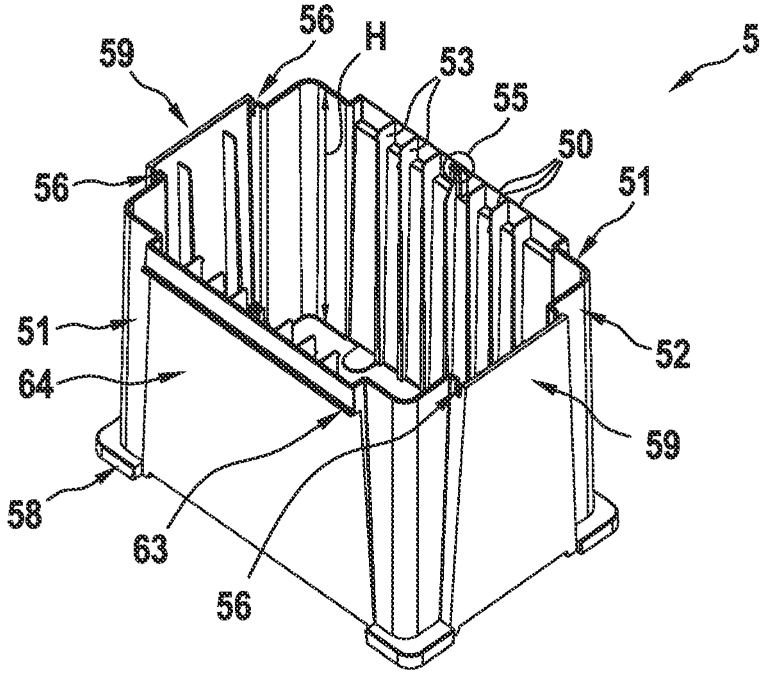
FIG. 1 shows a receiving frame according to the invention in a schematic view obliquely from above.

FIG. 1 shows a receiving frame 5 in an exemplary embodiment according to the present invention. The schematic view shows the receiving frame obliquely from above. The receiving frame 5 is configured to support at least two specific embodiments of support plates 1, 3 for pipette tips. It is formed by two opposing longitudinal walls 51 and two opposing transverse walls. The longitudinal walls 51 and transverse walls 52 are connected to each other in such a way that, in this case, they form a substantially rectangular basic shape. They laterally enclose an interior space 60.

Each longitudinal wall 51 and each transverse wall 52 have an upper side and a lower side, as well as a height H. The height H is marked with a double arrow for the rear longitudinal wall 51 as an example. Together, the upper sides form a circumferential support surface 50 onto which a support plate for pipette tips 1, 3 can be placed. Typically, the upper side is also the upper side of the receiving frame 5. The lower side comprises a footprint 58 (see also FIG. 6 or 9). The footprint 58 may be formed by its own foot part which is connected to the lower side of the longitudinal and transverse walls 51, 52. The height of the receiving frame 5 is thus determined here by the height of the longitudinal or transverse walls 51, 52 plus the height of the foot part. On the other hand, it may be provided that the footprint 58 is directly formed by the lower sides of the longitudinal and transverse walls 51, 52, and/or that further structures such as complementary foot parts are provided on the lower sides of the longitudinal and/or transverse walls 51, 52 in order to increase the stability of the receiving frame 5 on a surface. This is shown by way of example in FIG. 1.

The support surface formed by the longitudinal walls 51 and transverse walls 52 is shown here almost continuously circumferential. It is interrupted only by a total of four guide slots in the transverse walls 52. However, depending on the design of the walls 51, 52, there may be several interruptions, as long as this does not lead to an unstable fit of the attached support plate 1, 3 on the receiving frame 5. It is essential for a stable fit in this case that the support surface extends planarly in one plane.

The course of the support surface 50 is adapted so that at least the two different embodiments of the support plates for pipette tips can be placed on the receiving frame with a stable fit. It represents a support compromise, so to speak. For this purpose, in this case both longitudinal walls 51 and both transverse walls have U-shaped protrusions 59, 64. In the embodiment shown here, the protrusions 59, 64 are shorter on the lower side of the receiving frame 5 than on the upper side, and are thus asymmetrical, so that the upper support surface encloses an enlarged interior space.

On the inner sides of the longitudinal walls 51 and transverse walls 52, inner webs 53 are located in each case in the protrusions. The inner webs 53 on the transverse walls 52 are offset in relation to the upper side in the direction of the lower side and in this case serve primarily to stabilize the receiving frame 5. The inner webs 53 on the longitudinal walls 51, on the other hand, close flush with the upper side of these longitudinal walls 51. They form here an addition to the support surface 50, on which either reinforcing struts 15 on the lower side of the support plate for pipette tips of the first embodiment 1 can rest, or on which the support plate for pipette tips of the second embodiment rests with its flat lower side 37.

The receiving frame 5 further comprises a respective guide claw 55 on the inner side of each longitudinal wall 51. In the embodiment shown here, each of the guide claws 55 is structurally connected to an inner web 53, wherein the inner web 53 and thus also corresponding the guide claw 55 is arranged centrally on the longitudinal wall 51 in each case.

Finally, on the outside of each longitudinal wall 51 there is a gripper edge by means of which the receiving frame 5 can be gripped and moved, for example, in an automated manner by a gripper robot of a liquid handling platform.

Figure 2:
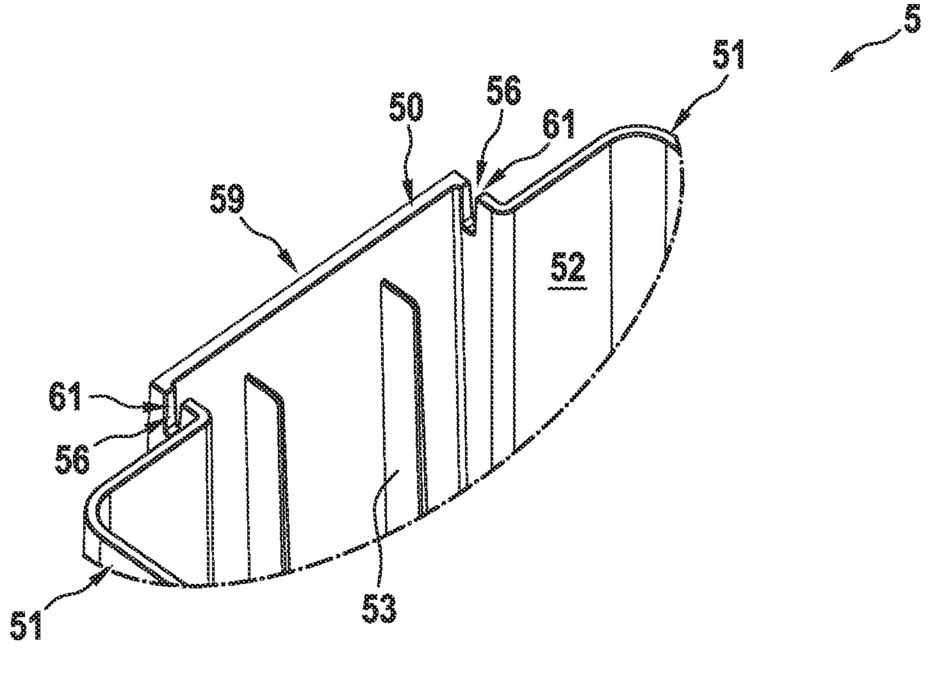
FIG. 2 shows an enlarged representation of a transverse wall of the receiving frame according to FIG. 1.

FIG. 2 shows an enlarged view of a transverse wall 52 of the receiving frame 5 according to FIG. 1. In particular, the upper side of the transverse wall 52 and the protrusion 59 of the transverse wall 52 with the two guide slots 56 are shown. The protrusion 59 in this embodiment is U-shaped, and formed by two spacer webs 61 and a transverse web 62.

One spacer web 61 is slotted in each case. Both slots of a protrusion 59 are aligned to jointly form a guide into which, for example, an orientation web 32 of a pipette tip support plate of the second embodiment can enter. Accordingly, the depth of each slot is adapted such that such an orientation web 32 does not strike the lower edge of the slot. In this way, the position of the orientation web 32 in the receiving frame 5 can prevent the support plate from incompletely resting on the receiving frame 5 and thus its fit from being unstable. In this regard, as long as a guide for a corresponding orientation web 32 can be formed by guide slots, the shape of the protrusion is not limited to a U-shape.

Figure 3:
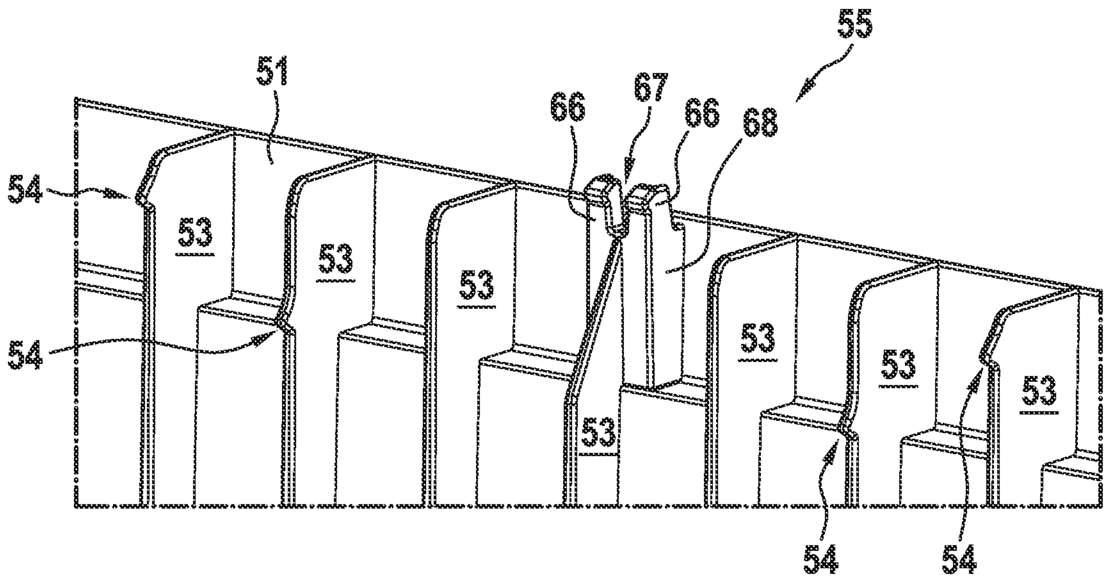
FIG. 3 shows an enlarged sectional view of a longitudinal wall of the receiving frame according to FIG. 1.

FIG. 3 shows an enlarged view of a longitudinal wall 51 of the receiving frame 5 according to FIG. 1, with a view in particular at the upper side of the longitudinal wall 51. In particular, the guide claw 55 on the inner side of the longitudinal wall 51 is shown. The guide claw 55 comprises a base 68 on which two claws 66 are arranged at a distance from each other. The spacing between them forms a guide 67. In addition, the claws 66 can thus have a slight spring effect.

Via the base 68, the guide claw 55 is connected both to the inner side of the longitudinal wall 51 and, in this case, to an inner web 53.

The guide claw 55 protrudes with its claws 66 over the upper side of the longitudinal wall 51 and thus over support surface 50. Thus, it can move into a lateral recess 31 of the support plate for pipette tips of the second embodiment 3 when the latter is placed on the receiving frame 5 (see also FIG. 10). At the same time, the guide claw 55 can enter with its guide slot 56 into a reinforcing strut 15 of the support plate for pipette tips of the first embodiment 1. Moreover, since the claws 66 both have a hook structure at their upper end, a light holding function can be exerted on the support plate of the second embodiment, upon interaction with said support plate. The support plate can nevertheless be manually lifted off the receiving frame 5 again when a suitable force is applied, for example by a user.

The inner webs 53 in this embodiment are arranged symmetrically on either side of the guide claw 55 on the longitudinal wall. A total of four of the inner webs 53 from this view each have a retaining ridge 54. In this regard, on two of the inner webs 53 the retaining ridges 54 are positioned at the upper end of the inner web 53, while on the other two the retaining ridges 54 are arranged offset from the upper side in the direction of the lower side on the inner web 53. The two upper retaining ridges 54 can cooperate with retaining lugs 11 on the pipette tip support plate of the first embodiment 1, thereby imparting a loose hold to this first support plate on the receiving frame 5. The position of the retaining lugs 11 can be seen in more detail in FIG. 5. The retaining ridges 54 have no function with respect to the pipette tip support plate of the second embodiment, since there are no complementary structures at the corresponding position on this support plate with which a retaining ridge 54 could interact.

On the other hand, the retaining ridges 54, which are arranged offset from the upper side of the receiving frame 5 at the inner webs 53, are arranged to cooperate in a retaining manner with an optional dividing insert 7. The dividing insert 7 is described in more detail in FIGS. 15 to 20. Since it is optional, the presence of retaining ridges 54 correspondingly cooperating with a dividing insert is also optional.

Figure 4:
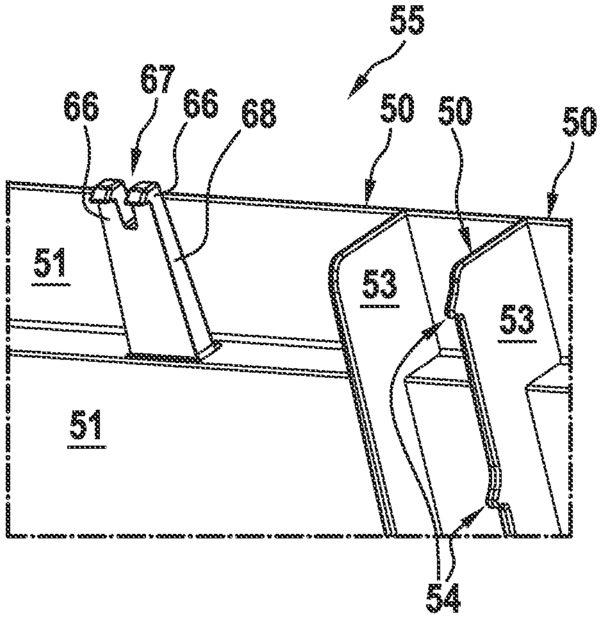
FIG. 4 shows an enlarged sectional view of a longitudinal wall of an alternative embodiment of a receiving frame.

FIG. 4 shows an enlarged view of a longitudinal wall 51 of a receiving frame 5 in an alternative embodiment, also in particular with a view at the upper side of the longitudinal wall 51. In this alternative embodiment, the guide claw 55 is positioned in the same way as in the embodiment of the receiving frame 5 shown in FIG. 3. However, the embodiments of the guide claw 55 and the inner webs 53 with retaining ridges differ from the corresponding formations as shown in FIG. 3:

In particular, in the case of the guide claw 55 in FIG. 4, the base 68 is not connected to an inner web 53, but to an offset arranged on the inner side of the longitudinal wall 51. Moreover, not only the claws 66 extend freely in the direction of the upper side of the receiving frame 5, but also the base 68, which leads to an increased spring effect compared to the embodiment shown in FIG. 3. The claws 66 themselves and the guide 67 are of comparable design, so that a guiding engagement in a support plate of the first embodiment (in the reinforcing struts 15) and a guiding engagement of the second embodiment (in its lateral recess 31) also takes place in a comparable manner.

The inner webs 53 in the embodiment of the receiving frame 5 shown in FIG. 4 differ from the receiving frame 5 shown in FIG. 3 both with regard to their position relative to the guide claw 55 and with regard to the arrangement of the retaining ridges 54. FIG. 4 shows three inner webs 53 which are flush with the support surface 50 for support plates 1, 3. Of these three inner webs 53, one inner web 53 has two retaining ridges 54. One retaining ridge 54 is positioned at the upper end of the inner web 53, while the second retaining ridge 54 of this inner web 53 is arranged offset from the upper side towards the lower side. The upper retaining ridge 54 may cooperate with a retaining lug 11 on the pipette tip support plate of the first embodiment 1, thereby imparting a loose hold of said first support plate on the receiving frame 5. The upper retaining ridge 54, which is offset with respect to the upper surface of the receiving frame 5, is arranged to cooperate with an optional dividing insert 7.

Figure 5:
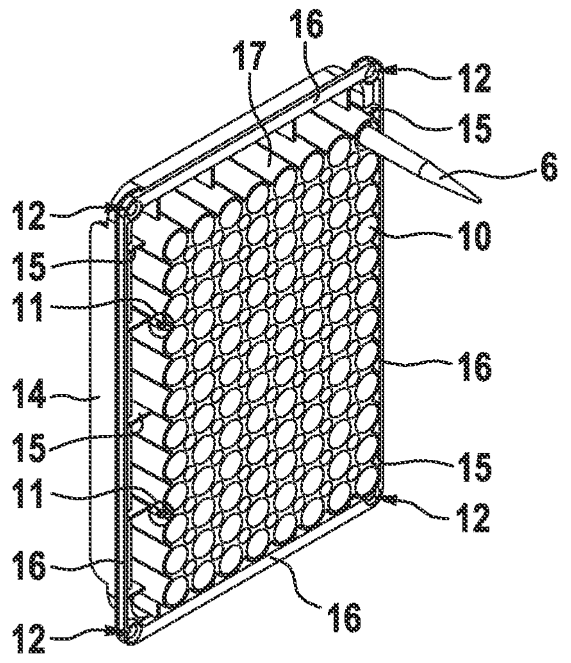
Fig. 5 prior art
FIG. 5 shows a prior art support plate for pipette tips of a first embodiment in an oblique view from below.

FIG. 5 shows a support plate for pipette tips 1 of the first embodiment, known from the prior art, in an oblique view from below. Such a support plate 1 is also named as SBS support plate as mentioned before. It is sold as a "Refill Insert" with different disposable tip sizes by the applicant (for example "LiHa, ANSI, 10 μL", order no. "LiHa, ANSI, 200 μL", order no. 30057814, "LiHa, ANSI, 200 μL", order no. 30057814 or example "LiHa, ANSI, 10 μL", order no. "LiHa, ANSI, 1000 μL", order no. 30057816).

Such an SBS support plate 1 has a base plate 17, in which a plurality of storage openings 10 are recessed for inserting and storing pipette tips 6. The arrangement (also called grid) of the storage openings 10 is standardized, as previously discussed. In the embodiment shown in FIG. 5, there are 96 storage openings 10. By way of example, one storage opening 10 is shown occupied by a pipette tip 6. The support plate 1 also has an edge extending around the base plate 17 with a support surface 16 extending continuously around the lower side for a so-called SBS receiving box adapted to the SBS support plate 1 (such as, for example, the "DiTi Box, LiHa, empty, ANSI format" of the applicant (order number 30058506 or 30058507). The support surface 16 allows the SBS support plate to be placed on the SBS receiving box without wobbling, thus it does not tilt on the support surface from one position to another (no horizontal play). The circumferential edge is spaced from the base plate 17 by a plurality of reinforcing struts 15 on the lower side thereof. When the SBS support plate 1 is placed on an SBS standard box, it rests on complementary structures of the SBS standard box both with the circumferential support surface 16 and with the reinforcing struts 15. The reinforcing struts 15 thus form part of the support surface 16. The grid of storage openings is not only point-symmetrical in itself, but also standardized and point-symmetrically positioned on the SBS receiving box (not shown).

At each of the four corners in the circumferential edge there is a centering opening 12, into which complementary centering pins on the SBS standard box move in a reversible and slightly friction-locking manner when the support plate 1 is placed, thus centering and holding the support plate 1 on the SBS standard box.

Due to the centering pins on the SBS standard box, a support plate 3 of the second embodiment cannot be placed on this standard box, as this support plate 3 lacks complementary centering openings. The centering pins result in the support plate of the second embodiment being spaced from the support surface of the standard box without providing a secure fit.

It is possible that the SBS support plate (support plate 1 of the first embodiment) comprises an optional orientation aid for placing this support plate 1 in a defined orientation on the corresponding SBS standard box. This is a web receptacle 13, into which a complementary orientation web on a transverse side of the SBS standard box projects (not shown). The web receptacle 13 is an optional recess in the peripheral edge of the support plate 1 of the first embodiment. Since the orientation web is positioned at the top edge of the transverse side, the first support plate 1 will only come to rest flat on the SBS standard box if it is placed in the correct position on the box and the orientation web engages the web receptacle 13. No structures complementary to such an optional web receptacle 13 are provided on the receiving frame 5 according to the invention, which would lead to an interaction.

The support plate 1 of the first embodiment has an engagement surface for a robot gripper on its upper side along each of the longitudinal sides, so that this support plate can be moved in an automated manner, for example in a liquid handling platform.

Finally, the support plate 1 of the first embodiment comprises at least two retaining lugs 11 on each of the outer longitudinal sides of the base plate 17. The retaining lugs 11 are arranged along the longitudinal side at the same position as two reinforcing struts 15, but closer to the lower side of the base plate 17.

Figure 6:
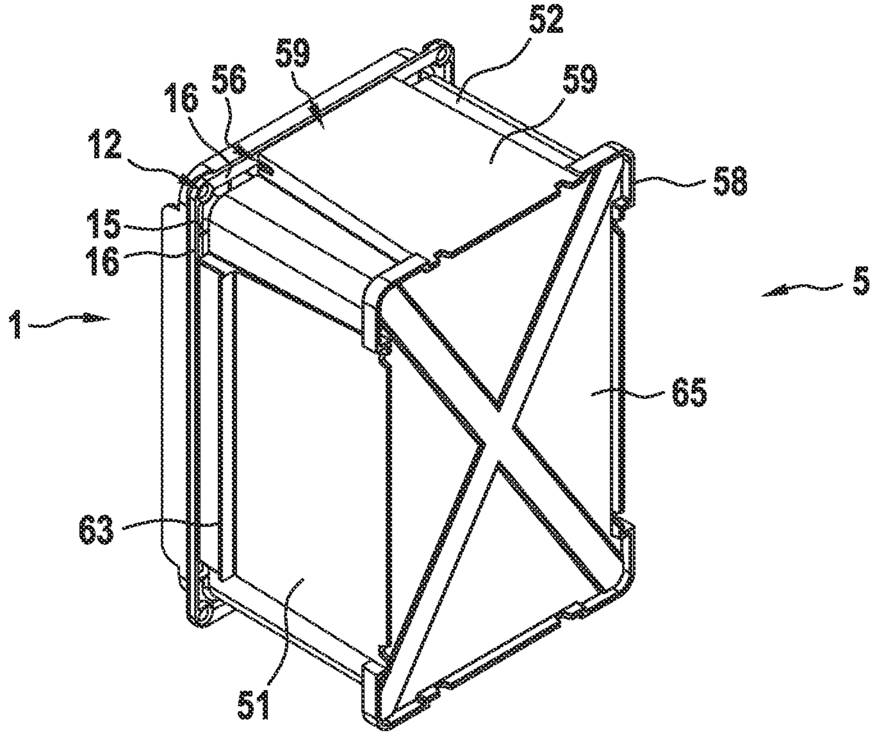
FIG. 6 shows a side view from below of a receiving frame with base plate and attached support plate for pipette tips from FIG. 5.

FIG. 6 shows an assembly of a receiving frame 5 according to the invention and the support plate for pipette tips 1 of the first embodiment shown in FIG. 5. The receiving frame 5 comprises a base plate 65 which is clearly visible in this view, wherein the footprint 58 is formed by moldings of the lower sides of the longitudinal walls 51 and the transverse walls 52. These formations thus form a foot part of the receiving frame 5.

In FIG. 6, the assembly is formed by the receiving frame 5 and the attached support plate 1 and is shown in a side view from below. Thus, part of the interaction between the support surface 50 of the receiving frame 5 and the support surface 16 of the support plate 1 of the first embodiment is visible. Thus, it can be seen that not the entire support surface 50 of the receiving frame 5 is abutted by the support surface 16 of the support plate 1. Instead, the support plate 1 is placed with its support surface 16 in particular on the upper sides of the protrusions 59, 64 of the longitudinal walls 51 and transverse walls 52. On the remaining areas of the upper side or the support surface 50 of the receiving frame 5, respectively, the support plate 1 comes to rest only with its reinforcing struts 15.

In FIG. 6, it can be seen that the receiving frame 5 does not perform any function with respect to the centering openings 12 of the support plate 1. In addition, the guide slots 56 of the protrusion 59 of the transverse wall 52 do not perform any function with respect to the support plate 1 of the first embodiment. The receiving frame 5 exerts in particular a positioning function on the support plate 2 of the first embodiment by means of its guide claw(s) 55. In this case, a guide claw 55 enters with its guide 67 into one of the reinforcing struts 15 of the first support plate 1 (not shown, compare FIGS. 11*a* to 11*c*). Preferably, a guide claw 55 is positioned centrally on the longitudinal wall 51 of the receiving frame 5 for this purpose. In addition, a loose retaining function can be exerted via a retaining ridge 54 on one or more inner webs 53 of the receiving frame 5 by cooperating with the corresponding retaining lugs 11 on the lower side of the support plate 1 or its base plate 17. For this purpose, the base plate 17 of the support plate 1 of the first embodiment, which projects downwards beyond its support surface 16, sinks into the interior space 60 of the receiving frame 5.

Figure 7:
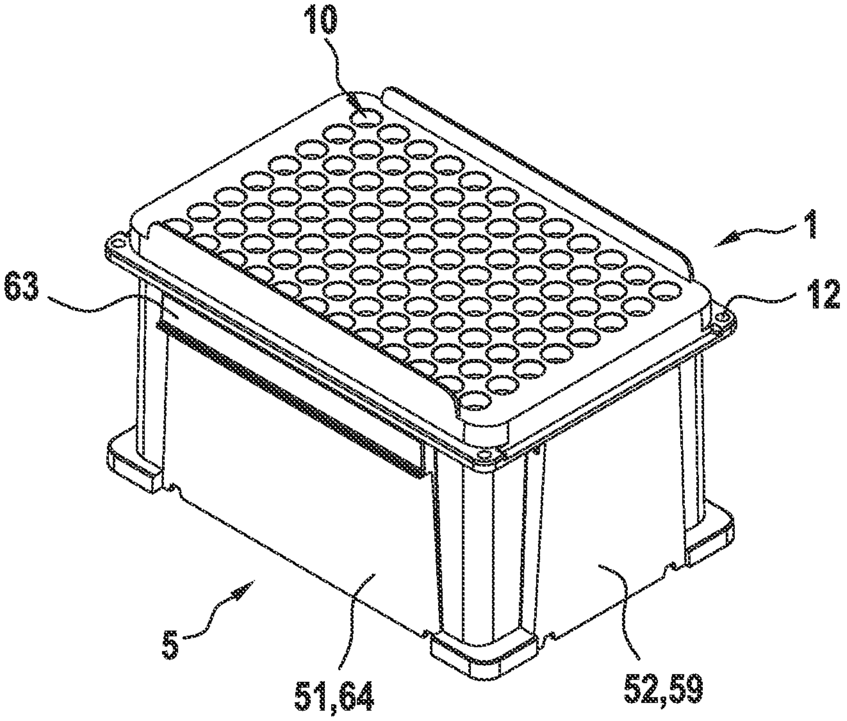
FIG. 7 shows a side view from above of a receiving frame with attached support plate for pipette tips from FIG. 5.

FIG. 7 shows a side view from above of an assembly, as can also be seen in FIG. 6. In this view, it can be seen that the support plate 1 of the first embodiment rests in particular on the protrusions 59, 64 of the longitudinal and transverse walls 51, 52, while it protrudes beyond the receiving frame 5, for example, at the corner regions where a longitudinal wall 51 meets a transverse wall 52 in each case. The centering openings 12 of the support plate 1 of the first embodiment thus have no "counter structure" on the receiving frame 5 with which they can interact. The gripper edge 63 on the protrusion 64 of the frontally displayed longitudinal wall 51 of the receiving frame 5 is accessible to a gripper robot, since the longitudinal side of this support plate 1 is substantially flush with the protrusion 64 on the longitudinal wall 51 of the receiving frame 5 or projects only minimally beyond this protrusion 64 (compare FIG. 6).

Figure 8:
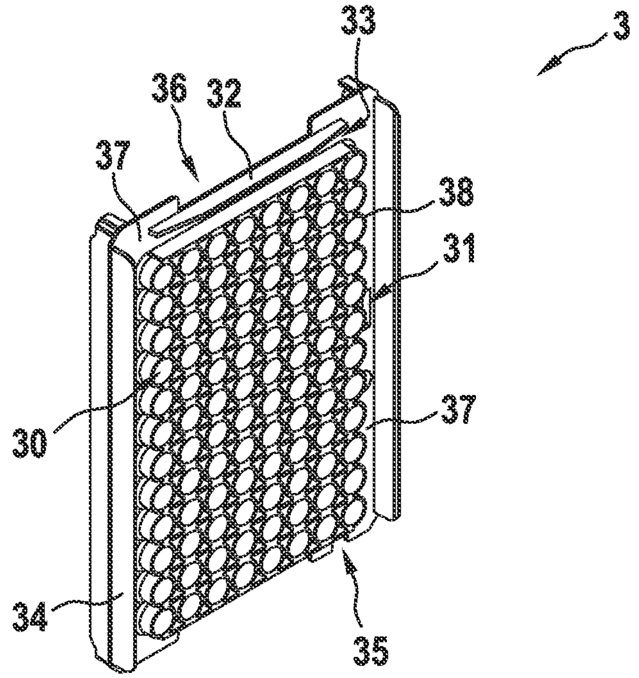
Fig. 8 prior art
FIG. 8 shows a prior art support plate for pipette tips of a second embodiment in an oblique view from below.

FIG. 8 shows a support plate 3 for pipette tips known per se from the prior art in a second embodiment in an oblique view from below. Such support plates 3 are available from the applicant under order no. 30104803 (LiHa, hanging tip format, 10 μL), 30000627 (LiHa, hanging tip format, 200 μL) or 30000630 (LiHa, hanging tip format, 1000 μL).

This support plate 3 also comprises a base plate 38 in which a plurality of storage openings 30 for pipette tips 6 are embedded. Here, a base plate 38 is shown with 96 storage openings 30 arranged in a standardized array of 8×12. The base plate 38 is surrounded by a continuous circumferential lower side 37, with which the support plate 3 rests on a receiving box adapted to it (not shown; available under "Deck Runner, Nest, FCA DiTi Tray, 4-Position", Tecan order no. 30042739). With the lower side 37, this support plate 3 rests on its receiving box without wobbling, that is to say that the lower side 37 of this support plate 3 is arranged plane-parallel to the support surface of its receiving box when it rests on the latter.

The support plate 3 of this second embodiment comprises, on its lower side 37, a recess 31 arranged centrally on the longitudinal side and at a distance from the base plate 38 and extending along this longitudinal side. The recess 31 thus arranged laterally is dimensioned such that a hook on the upper side of the adapted receiving box can enter this recess 31 when the support plate is placed on "its" receiving box, while the support plate continues to rest with its lower side 37 on the corresponding support surface of the receiving box. The hook extends along the longitudinal side of the receiving box.

Due to the presence of this hook, for example, a support plate 1 for pipette tips of the first embodiment cannot be placed on an existing receiving box for the support plate 1 of the second embodiment, as it lacks corresponding lateral recesses.

The support plate 3 of the second embodiment further comprises, at its lower side 37, an orientation web 32 extending at a distance from the base plate 38 along a transverse side. The support plate 3 further comprises, on its same transverse side, a recess 35 extending parallel to the orientation web 32. This recess 35 does not fully extend over the same length as the orientation web 32; however, it is almost directly adjacent thereto, so that the orientation web 32 constitutes a boundary of the recess 36 in the direction of the base plate 38. In fact, the orientation web 32 acts as a stop surface when the support plate 3 of the second embodiment is placed on a receiving box adapted thereto, since this receiving box comprises a position stop projecting upwards from its support surface, against which the support plate 3 is pushed (not shown).

For example, due to the position stop on the receiving box, a support plate 1 of the first embodiment cannot be placed on this receiving box for the support plate 3 of the second embodiment, as it does not have a complementary recess for receiving this stop.

On the transverse side opposite the orientation web 32, the support plate 3 of the second embodiment comprises a recess 35 extending from the outer edge towards the base plate 38 and dimensioned to receive a positioning pin of the receiving box when the support plate 3 is placed on its receiving box (not shown). Such a positioning pin is located on the upper side of the receiving box at a corner, so that the support plate 3 can be placed on its receiving box in only one orientation.

The support plate 3 of the second embodiment further comprises two engagement surfaces 34 for a robot gripper. The engagement surfaces 34 each extend along the longitudinal sides of the support plate 3 starting from the lower side 37.

Figure 9:
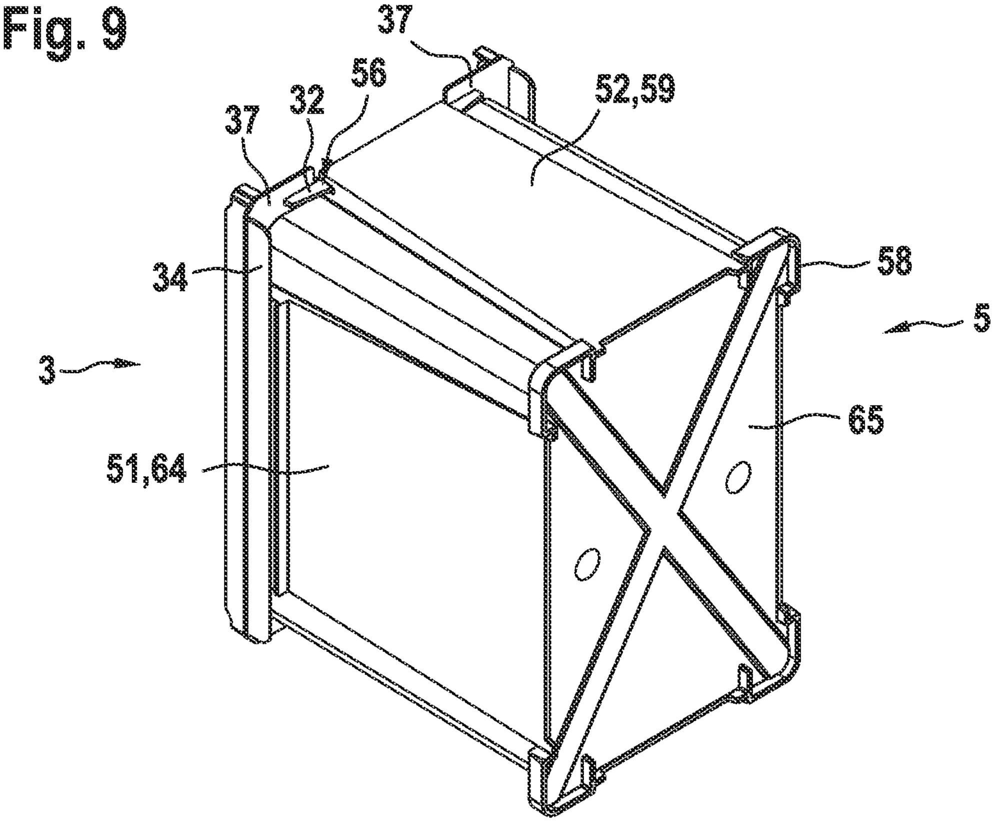
FIG. 9 shows a side view from below of a receiving frame with base plate and attached support plate for pipette tips from FIG. 8.

FIG. 9 shows a side view from below of a receiving frame 5 with base plate 65, as shown in FIG. 6, and a support plate 3 for pipette tips according to the second embodiment placed thereon. The receiving frame 5 and the support plate 3 placed thereon form a composite assembly. The base plate 65 is not necessary for the secure mounting of the support plate 3.

In this view, a part of the interaction between the support surface 50 of the receiving frame 5 and the support plate 3 of the second embodiment placed thereon is also visible. It can thus be seen that, in the detail shown, almost the entire support surface 50 of the receiving frame is abutted by the lower side 37 of the support plate 3 of the second embodiment. The orientation web 32 of the second support plate 3 is recessed in the guide slots 56 of the receiving frame 5 to such an extent that almost complete bearing is possible. Only the upper side of the transverse webs 62 of the protrusion 59 of the transverse walls 52 are not abutted by the support plate 3 of the second embodiment (compare FIG. 10).

Since the orientation web 32 of the support plate 3 of the second embodiment forms an orientation channel 33 due to its spacing from the base plate 38, this forms an accessible support surface for the receiving frame 5 according to the invention, which can be acted upon by its support surface 50 when the support plate 3 is placed on the receiving frame 5. This is possible if the orientation web 32 is recessed in the guide slots 56 of the receiving frame 5. In this way, despite the presence of the orientation web 32, the corresponding support surfaces of the second support plate 3 and of the receiving frame can act on each other in a plane-parallel manner. In this respect, it is sufficient if one of the transverse walls 52 of the receiving frame 5 comprises guide slots 56.

However, for simplified operation of the receiving frame 5, it may be provided that corresponding guide slots 56 are provided on both transverse walls 52. This allows the support plate 3 of the second embodiment to be placed in both longitudinal orientations.

The engagement surface 34 of the support plate 3 of the second embodiment for a robot gripper projects beyond the support surface 50 on the outside and along the longitudinal walls 51 of the receiving frame 5, without affecting the seating of this support plate 3 on the receiving frame 5.

Figure 10:
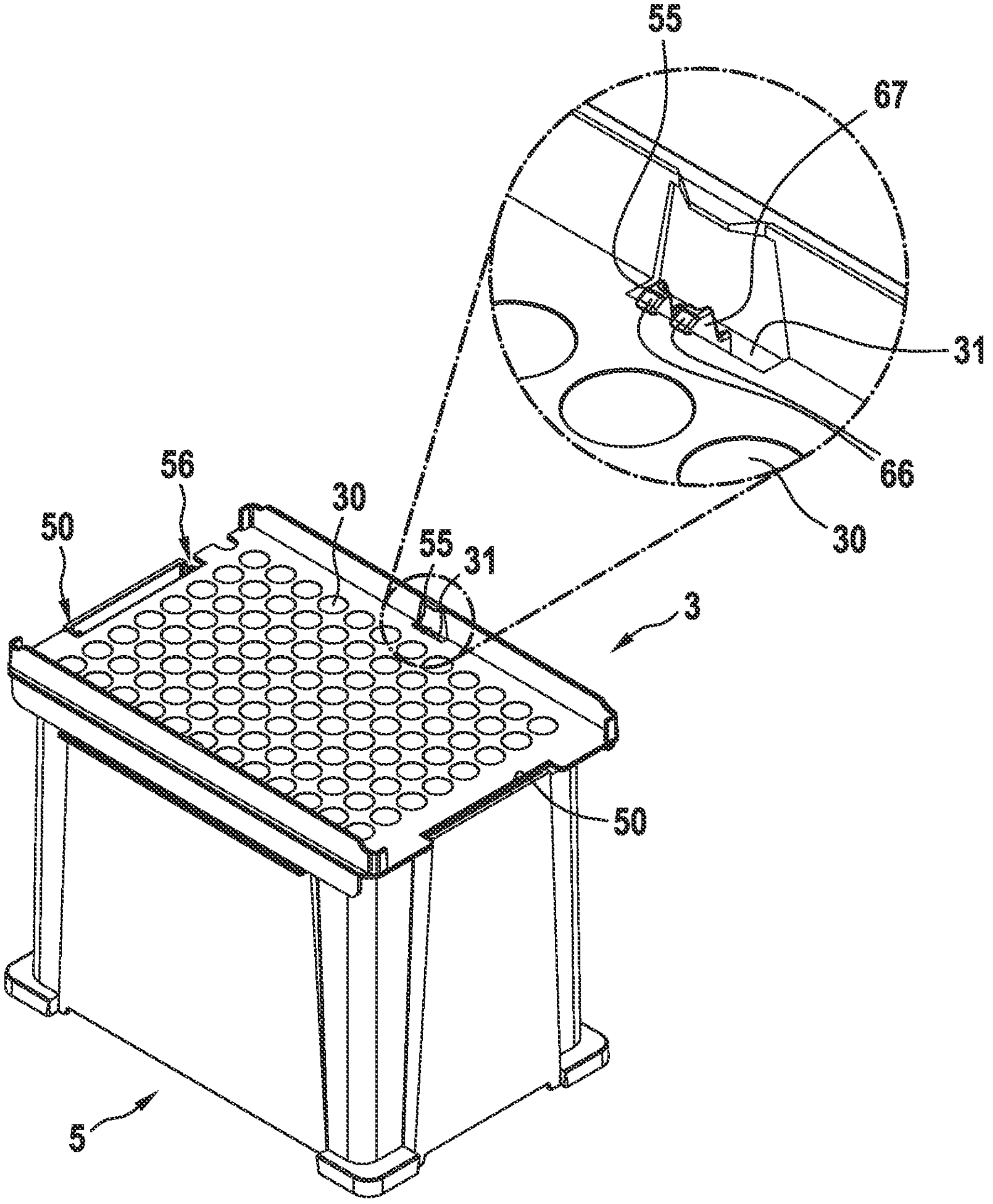
FIG. 10 shows a side view from above of a receiving frame with attached support plate for pipette tips from FIG. 8.

FIG. 10 shows a side view from above of an assembled assembly comprising a receiving frame 5 with an attached support plate 3 for pipette tips of the second embodiment of FIG. 9.

It can be clearly seen here that when the support plate 3 of the second embodiment is in place, the first connecting element of the receiving frame 5, the guide claw 55, moves into the lateral recess 31 of the support plate 3. For a better overview, this situation is shown in an enlargement in the dot-dashed circular section. It can be clearly seen in this enlargement that the guide claw 55 of the receiving frame 5 enters the lateral recess 31 of the support plate 3 of the second embodiment. In this way, the support plate 3 is guided into the correct position. In this embodiment, the guide claw additionally comprises a claw 66 at the distal end of each guide 67. The claw 66 thereby protrudes slightly beyond the upper side of the base plate 38 with the storage openings 30 for pipette tips 6 when the support plate 3 is placed on the receiving frame. Since the guides 67 are slightly resiliently arranged at the base 68 of the guide claw 55 (compare FIGS. 3 and 4), the claws impart a loose hold of the support plate 3 on the receiving frame 5 which nevertheless allows easy lifting of the support plate 3.

For a stable hold, it is not necessary for the receiving frame 5 to have a guide claw 55 on each of its longitudinal walls 51. However, it can be advantageous if the support plate 3 is oriented on both sides on the receiving frame by the guide claw 55 (not shown here, see FIG. 1).

Figure 11C:
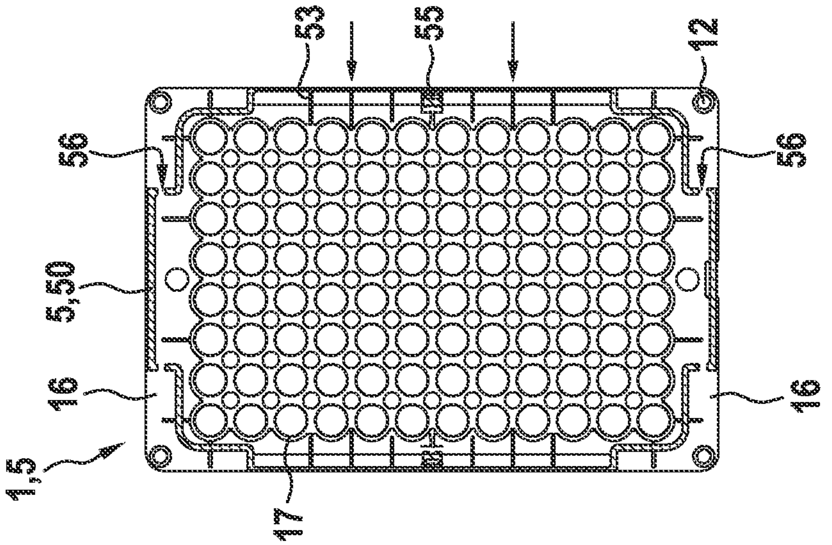
FIG. 11C shows a highly schematized overlay of the views shown in FIGS. 11A and 11B.
Figure 11B:
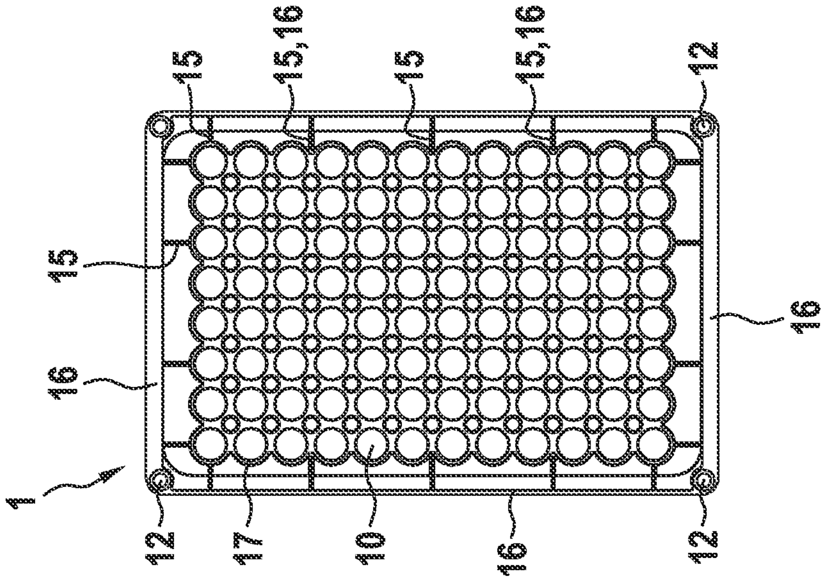
FIG. 11B shows a highly schematized bottom view of a support plate of the first embodiment, focusing on the support surface for a receiving frame.
Figure 11A:
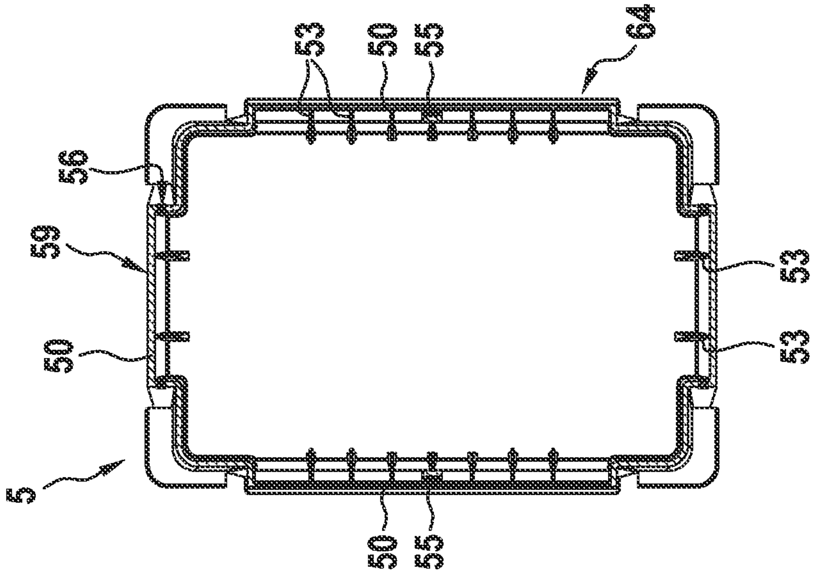
FIG. 11A shows a highly schematized top view of a receiving frame 5 according to the invention, with particular focus on the support surface 50 for the two support plates.

FIGS. 11A to 11C show in highly schematized views those structures on a support plate 1 of the first embodiment and on a receiving frame 5 according to the invention, which are brought into contact with each other when this support plate 1 is placed on the receiving frame.

FIG. 11A shows a top view of a receiving frame 5. In particular, the support surface 50 for the two support plates 1, 3 is shown, which for the sake of clarity is shown embedded in the essential structures such as longitudinal and transverse walls 51, 52 of the receiving frame 5. The support surface 50 is shown hatched here and also in FIG. 11C. Also visible from above are the inner webs 53, the upper sides of which in this case also partially contribute to the support surface 50. From FIG. 11C it can be seen in more detail that in this embodiment it is in particular the inner webs 53 on the longitudinal walls 51 that contribute to the support surface 50—the inner webs 53 on the transverse walls are offset with respect to the upper side.

The inner webs 53 in this embodiment are widened on the lower side of the receiving frame 5 compared to their embodiment on the upper side of the receiving frame 5, both in the direction of the opposite wall and in their extension along the wall to which they are attached. A guide claw 55 is arranged on the inner web 53 arranged centrally on each longitudinal wall 51. Also visible in this top view, at each of the four outer corners, are portions of the foot of the receiving frame which contributes to the footprint.

FIG. 11B shows a view of a support plate 1 of the first embodiment from below. In particular, the outline of the base plate 17 with the storage openings 10 for pipette tips as well as the structures surrounding the base plate are shown here, with which this support plate 1 is placed on the receiving frame 5 shown in FIG. 11A. The continuous support surface 16 surrounding the base plate 17 can be clearly seen, the geometry of which is adapted to a standard SBS box. This support surface 16 is connected to and spaced from the base plate 17 by means of reinforcing struts 15. The lower side of the reinforcing struts is flush with the circumferential support surface 16, so that they can also be acted upon as part of the support surface 16. Also shown are the four centering openings 12 in the support surface 16, with one centering opening 12 in each corner. In the embodiment shown here, the support plate 1 is of point-symmetrical design.

FIG. 11C shows an overlay of the views in FIG. 11A and FIG. 11B. The overlay is shown in such a way that it can be seen how the support plate of the first embodiment of FIG. 11B is positioned relative to the receiving frame 5 of FIG. 11A and abuts it when it is placed on the receiving frame 5. The support surfaces 50 of the receiving frame 5 are shown hatched. It can be clearly seen how the four corners of the support plate with the centering openings 12 project beyond the support surface 50. Instead, the support plate 1 of the first embodiment abuts the corner regions of the support surface 50 of the receiving frame with its reinforcing struts 15 which are arranged in this region. The circumferential support surface 16 of the support plate 1 of the first embodiment shown here acts on the support surface 50 for support plates of the receiving frame 5 substantially at the upper sides of the protrusions 59, 64 of the longitudinal and transverse walls 51, 52.

In each case, the reinforcing strut 15, which is arranged centrally on each longitudinal side of the support plate 1 of the first embodiment, comes into position above a guide claw 55, which is also arranged centrally on each longitudinal wall 51 of the receiving frame 5. Thereby, this reinforcing strut 15 is inserted into the guide 67 of the guide claw 55 which protrudes above the upper side of the corresponding longitudinal wall 51. In this way, the support plate 1 of the first embodiment can rest flat on the support surface 50 of the receiving frame 5, although no opening is provided through which the protruding guide claw 55 can be guided. The positioning of this central reinforcing strut 15 of the first support plate 1 with respect to the guide claw 55 of the receiving frame 5 is indicated in FIG. 11C.

Moreover, the support plate 1 of the first embodiment rests with its support surface 16 not only on the support surface of the receiving frame on the protrusions 64 of the longitudinal walls 51. In addition, it rests with two further reinforcing struts on its longitudinal sides on the upper side of complementarily positioned inner webs 53 on the longitudinal walls 51 of the receiving frame 5.

Finally, FIG. 11C also shows the interaction between the inner webs 53 on the longitudinal walls 51 of the receiving frame 5 and the base plate 17 of the support plate 1 of the first embodiment. In this respect, the inner webs 53 of the receiving frame 5, in particular on its longitudinal walls 51, project so far into its interior space 60 that, when the first support plate 1 is in place and its base plate 17 also projects into the interior space 60 of the receiving frame 5, they almost touch the outer sides of the base plate 17. Since the support plate 1 of the first embodiment has a retaining lug 11 on both outer longitudinal sides of its base plate 17 in each case below two reinforcing struts 15 (compare FIG. 5), additional stabilization of the mounted support plate 1 can be achieved by the optional use of retaining ridges 54 on the complementary inner webs 53 of the receiving frame 5. For this purpose, the retaining ridges 54 are dimensioned in such a way that they cooperate with the retaining lugs 11 on the base plate 17 of the support plate (by being able to make slight contact with each other). A corresponding situation between the retaining lug 11 and the retaining ridges 54 is indicated in FIG. 11C for two inner webs 53 on the right longitudinal wall, each with an arrow.

Figures 12A, 12B, 12C:
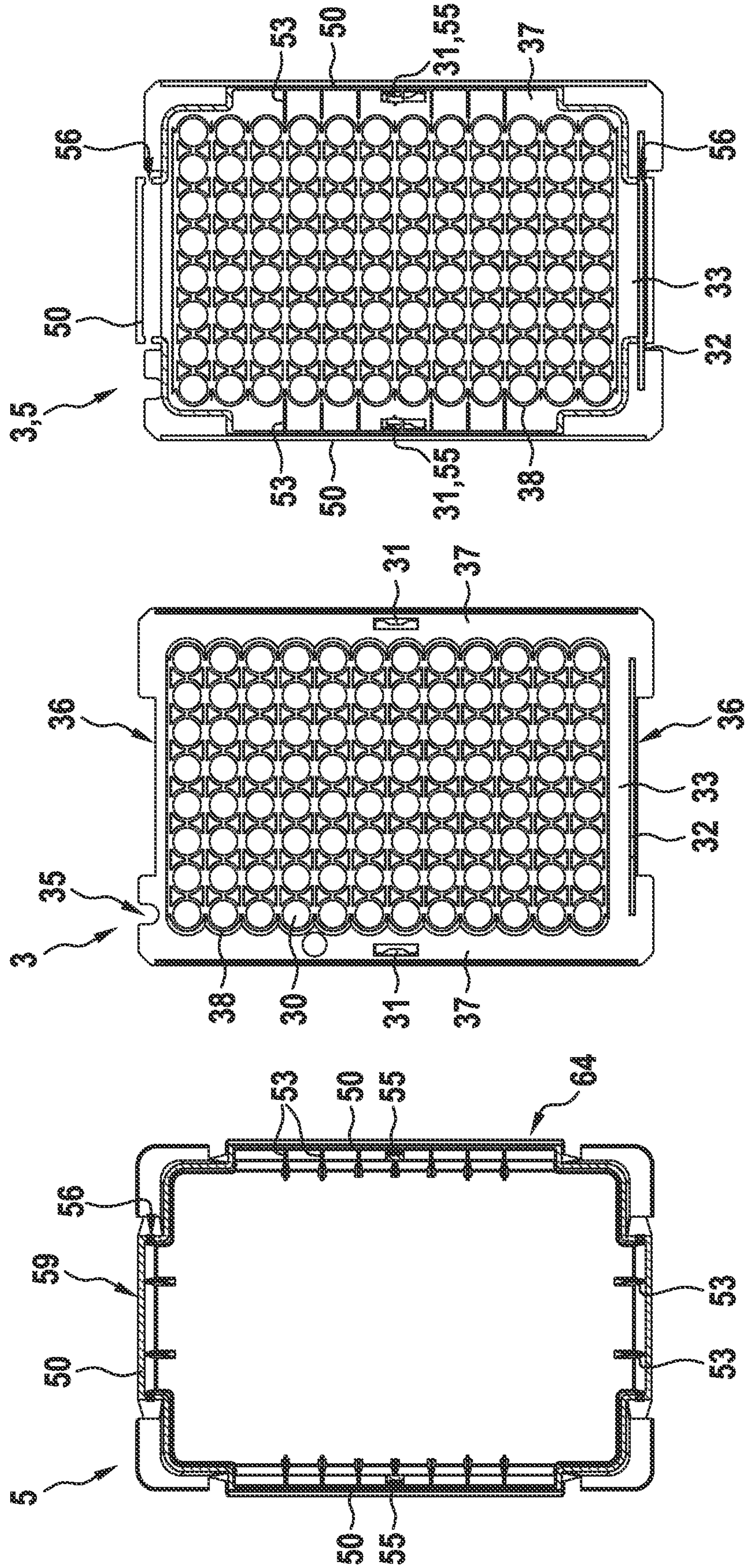
FIG. 12A shows a highly schematized top view of a receiving frame 5 according to the invention with particular focus on the support surface 50 for the two support plates.
FIG. 12B shows a highly schematized bottom view of a support plate of the second embodiment, focusing on the support surface for a receiving frame.
FIG. 12C shows a highly schematized overlay of the views shown in FIGS. 12A and 12B.

FIGS. 12A to 12C show, in highly schematized views, those structures on a support plate 3 of the second embodiment and on a receiving frame 5 according to the invention which are brought into contact when this support plate 3 is placed on the receiving frame 5.

In FIG. 12A a top view of a receiving frame 5 is shown. This view corresponds to the view shown and described in FIG. 11A.

FIG. 12B shows a view of a support plate 3 of the second embodiment from below (for an alternative view, see also FIG. 8). The outline of the base plate 38 with the storage openings 30 for pipette tips as well as the lower side of the circumferential structures forming the support surface 37 can be clearly seen here. Arranged centrally of the longitudinal sides, the lateral recesses 31 can be seen. On a transverse side, the orientation web 32 can also be seen, as well as the orientation channel 33 formed between the orientation web 32 and the base plate 38, which is also part of the support surface 37.

It can be seen from the view shown in FIG. 12B that the arrangement of the storage openings 30 in the base plate 38 is point-symmetrical. The base plate 38 itself is also axially symmetrical with respect to the outer edges of the longitudinal sides of the support plate 3 of the second embodiment. However, with respect to the transverse sides and with respect to the position of the base plate 38 relative to the transverse sides, the support plate 3 of the second embodiment is formed asymmetrically: On the one hand, the base plate is arranged at a smaller distance from the upper transverse side, while the distance from the lower transverse side is larger in comparison. Furthermore, the upper transverse side has an asymmetrically arranged recess 35 for a positioning pin. Further recesses 36 are again symmetrically provided on the upper and lower transverse sides.

FIG. 12C shows an overlay of the views in FIGS. 12A and 12B. The overlay is also shown here in such a way that it can be seen how the support plate 3 of the second embodiment in FIG. 12B is positioned in relation to the receiving frame in FIG. 12A and acts on it when it is placed on the receiving frame 5.

From this overlay it can be seen that the support plate 3 of the second embodiment rests with a large part of its support surface 37 on its lower side on the support surface for support plates 1, 2 of the receiving frame. The circumferential support surface 37 is thus so wide on the longitudinal sides of this second support plate 34 that the upper sides of the inner webs 53 on the longitudinal walls 51 of the receiving frame fully engage the support surface 37. Moreover, the receiving frame 5 is dimensioned in such a way that the inner webs 53 protrude towards the base plate 38 of the second support plate 3, but do not clamp the latter when it is placed on the receiving frame 5. This is possible because they project into the spaces between adjacent storage openings 30 when the support plate 3 is in place, but do not contact the corresponding outer surface.

From this overlay, it is also possible to see the position of the orientation web in the guide slots 56 of the lower transverse wall 52 when the support plate 3 of the second embodiment is placed on the receiving frame 5. Likewise, the position of the two guide claws 55 of the receiving frame 5 in the respective lateral recesses 31 on the longitudinal sides of the support plate 3 can be seen. In this case, the guide claws 55 are of smaller dimensions than the lateral recesses 31, so that there is play in the direction of the respective transverse sides (upwards and downwards in this view). This play is minimized when the support plate 3 is in place, due to the orientation web 32 being retracted into the guide slots 56. Play from left to right in this view can be minimized by means of claws 66 on the guide claws 55, as previously described.

Figure 13:
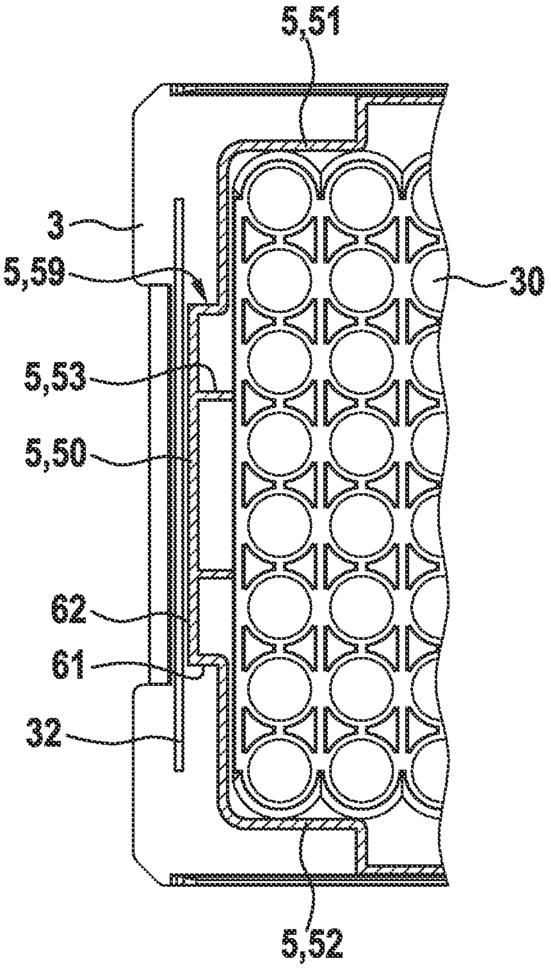
FIG. 13 shows a highly schematized section of the situation at a transverse wall of an alternative receiving frame in an overlay with a support plate of the first embodiment.

FIG. 13 shows a highly schematized section of an overlay of the structures concerned for the overlay of an alternative receiving frame with a support plate of the first and the second embodiment at the situation at one of the transverse walls. A transverse wall shown on the left can be seen here. Unlike the receiving frame 5 shown by way of example in FIGS. 11A to 11C or 12A to 12C, this receiving frame 5 does have a protrusion 59 on the transverse wall 52. However, there are no guide slots in this protrusion into which the orientation web 32 of the support plate 3 of the second embodiment can be countersunk for placing the support plate. Instead, the spacer web 61, which is used to determine the spacing of the transverse web 62 of the recess relative to the lateral regions of the transverse wall 52, is shortened compared to the embodiments of FIG. 11A. As a result, the upper surface of the transverse web 62 and the spacer web 61 is also acted upon by the support surface 37 on the lower surface of the support plate 3 of the second embodiment after this support plate is placed on the receiving frame 5. The length of the spacer web 61 is thereby adapted to the support plate 3 of the second embodiment in such a way that the orientation web 32 of this second support plate 3 projects past the outer side of the transverse wall 52 and its protrusion 59. A support plate 1 of the first embodiment acts on the upper side of the transverse wall 52 and its protrusion 59 of this receiving frame 5 with its reinforcing struts 15 (not shown).

Figure 14:
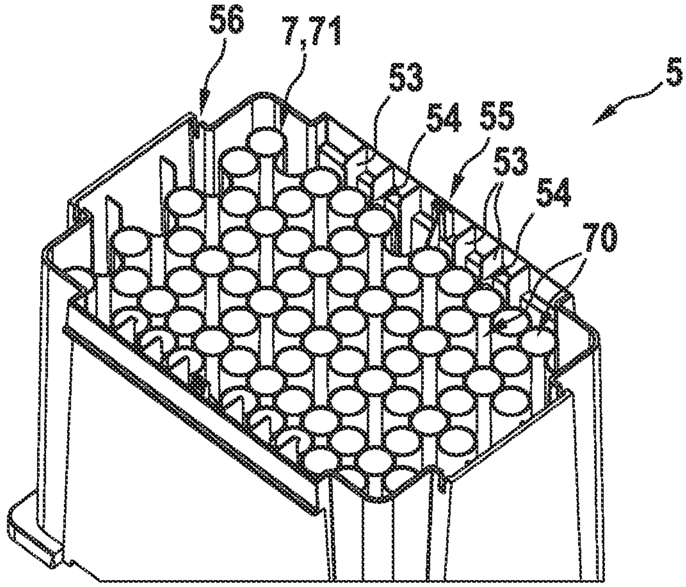
FIG. 14 shows an overview view of a receiving frame according to the invention of a first embodiment, comprising a dividing insert of a first embodiment.

FIG. 14 shows an overview drawing of a receiving frame 5 according to the invention of a first embodiment with a dividing insert 7 in a first embodiment for accommodating 96 pipette tips 6, which is positioned in the interior space of the receiving frame 5. Pipette tips 6 are not shown here. The receiving frame 5 corresponds to the embodiment shown in FIG. 1 with regard to the embodiment of the guide claws 55, the guide slots 56 and the inner webs 53 with the retaining ridges 54.

Figure 19:
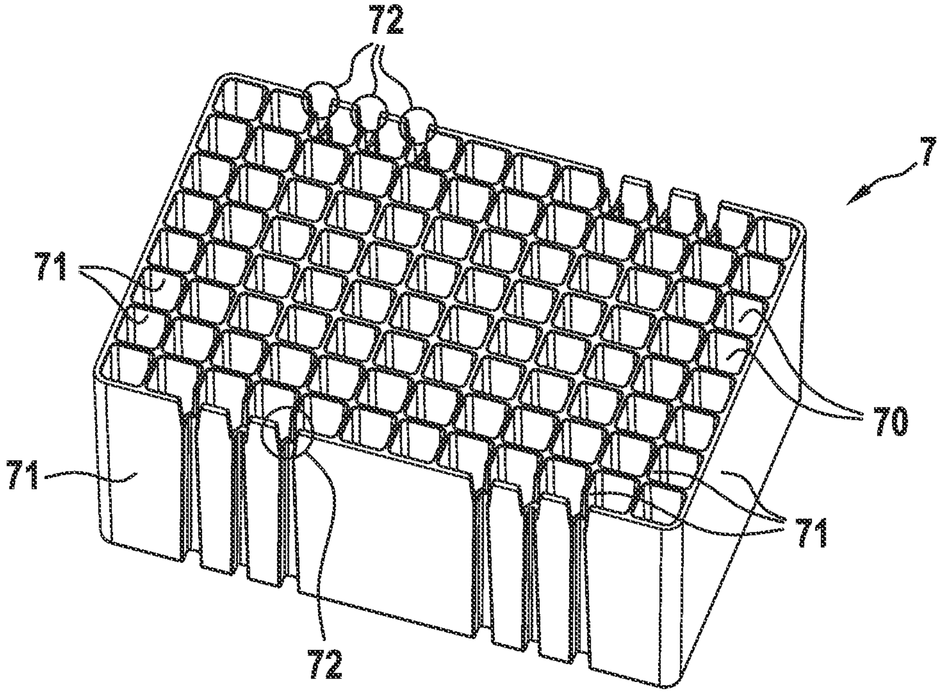
FIG. 19 shows an overview view of a dividing insert of the second embodiment.

A dividing insert 7 may extend in the receiving frame 5 over almost its entire height H, resting for example on a base plate 65 or positioned slightly above the lower side of the longitudinal and transverse walls 51, 52 (see also FIG. 19). It also extends towards the upper side of the longitudinal and transverse walls 52; however, it is not provided that the dividing insert 7 extends towards the upper side of the receiving frame 5 in such a way that an attached support plate 5 contacts the dividing insert 7.

Such a high dividing insert 7 is particularly suitable for keeping long pipette tips 6 separated from each other in the receiving frame. However, it is also possible that a dividing insert 7 is designed to be significantly shorter and, for example, primarily accommodates and separates the outlet ends of pipette tips 6 projecting into the receiving frame. A positioning in the lower or middle area of the interior space 60 of the receiving frame 5 may be provided in these cases.

A dividing insert 7 comprises a plurality of dividing walls 71. In the embodiment of the dividing insert shown here, the dividing walls 71 are formed as cylindrical hollow bodies with a circular base. The cylindrical hollow bodies can also be readily seen in FIG. 19. In each case, a cylindrical hollow body can form a receiving opening 70 for a pipette tip 6. In this embodiment of the dividing insert 7 it is not mandatory that each of the necessary 96 receiving openings 70 is formed by its own hollow cylinder. Rather, receiving openings 70 can be realized in this dividing insert 7, for example, by being surrounded and thereby delimited by the outer sides of the hollow cylinders forming the surrounding receiving openings 70. Likewise, receiving openings 70 are provided on the outer sides of the dividing insert 7, each of which is formed by a corresponding half cylindrical hollow body. In this case, an outer boundary is formed by the inner side of the nearest longitudinal wall 51 or the inner side of the nearest transverse wall 52 (see also FIG. 18).

Figure 15:
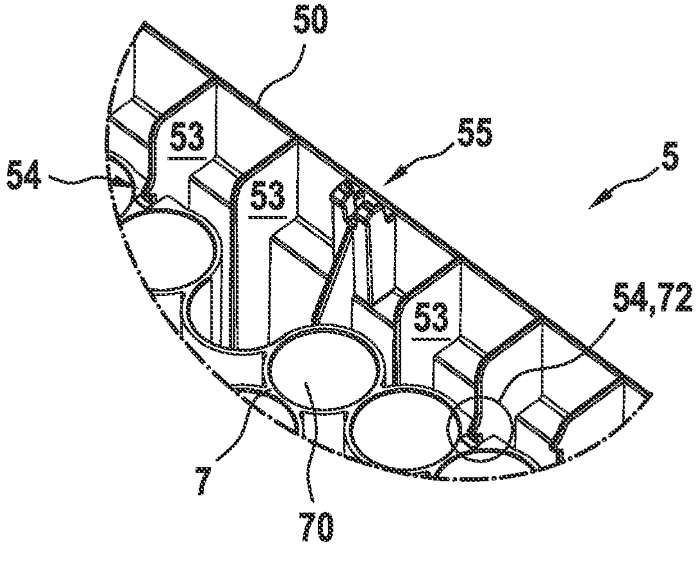
FIG. 15 shows a detailed view of the receiving frame with inserted dividing insert according to FIG. 14.

FIG. 15 shows a detailed view of the receiving frame 5 with the dividing insert 7 inserted as shown in FIG. 14. Here, the interaction between a retaining ridge 54 on an inner web 53 of the receiving frame 5 and the dividing insert 7 can be seen. The dividing insert 7 here comprises a recess 72, into which the retaining ridge 54 of the receiving frame 5 projects when the dividing insert 7 is inserted. It is provided here that the retaining ridge 54, which is further offset towards the lower side with respect to the upper side of the receiving frame 5, cooperates with the dividing insert 7. The interaction of this retaining ridge 54 with the recess 72 in the dividing insert 7 can, for example, reduce the risk of the dividing insert 7 falling out when the receiving frame 5 moves.

Figure 16:
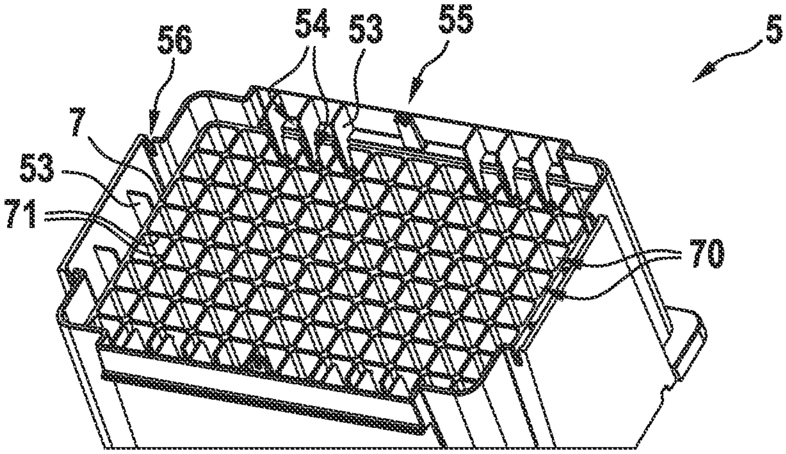
FIG. 16 shows an overview view of a receiving frame according to the invention of a further embodiment with a dividing insert of a second embodiment.

FIG. 16 shows a general view of a receiving frame of a further embodiment, in which a second embodiment of a dividing insert is inserted. The receiving frame 5 corresponds to the embodiment shown in FIG. 4 with regard to the design of the guide claws 55, the guide slots 56 and the inner webs 53 with the retaining ridges 54.

The dividing insert 7 extends in the receiving frame 5 over almost its entire height H. Here, too, it is not provided that an attached support plate 5 should touch the dividing insert 7. Rather, a dividing insert 7 of such a height is particularly suitable for keeping long pipette tips 6 separated from each other in the receiving frame. However, it is also possible that the dividing insert 7 is configured to be of significantly shorter design, and thus in particular accommodates and separates the outlet ends of pipette tips 6 projecting into the receiving frame. The possible configurations of the dividing insert 7 with respect to its height and its position in the interior space 60 of the receiving frame 5 with respect to the dividing insert 7 shown in FIG. 14 or 15 can be applied equally to the dividing insert 7 of FIGS. 16 and 17.

The dividing insert 7 again comprises a plurality of dividing walls 71. In the embodiment shown here, the dividing walls 71 are longitudinal and transverse walls which each extend parallel to the longitudinal walls 51 or transverse walls 52 of the receiving frame 5 and thus determine the arrangement of the receiving openings. A receiving opening 70 in the dividing insert 7 is formed by two longitudinal walls and two transverse walls, respectively. The distances between the dividing walls 71 are chosen such that a respective receiving opening 70 can receive a pipette tip 6 of a particular type. However, depending on requirements, the longitudinal and transverse walls can also be arranged in such a way that, for example, four adjacent pipette tips 6 each project into a common receiving opening 70.

Figure 17:
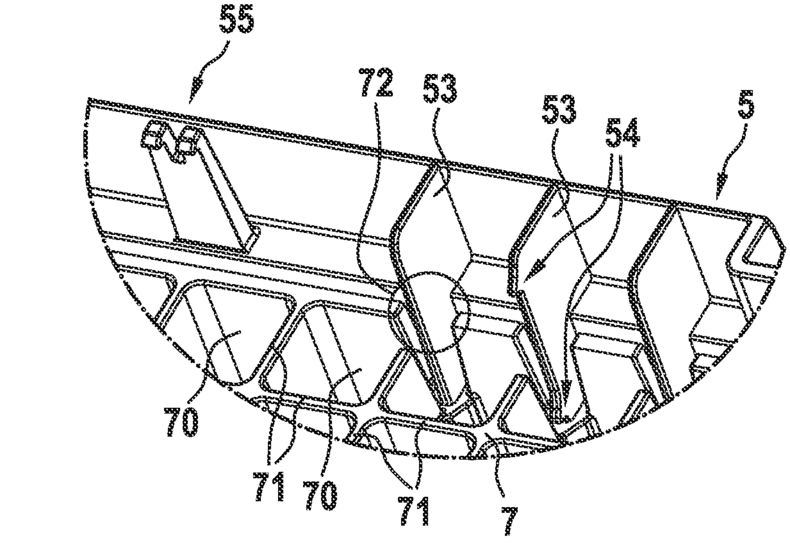
FIG. 17 shows a detailed view of the receiving frame with inserted dividing insert according to FIG. 16.

FIG. 17 shows a detailed view of the receiving frame 5 with inserted dividing insert 7 as shown in FIG. 16, in particular the interaction between the shown inner webs 53 of the receiving frame 5 and the dividing insert 7. The dividing insert 7 here also comprises recesses 72 into which the inner webs 53 of the receiving frame 5 project. A recess 72 is realized in this second embodiment of the dividing insert 7 in each case on dividing walls 71. This concerns in each case the contact points of a transverse wall with the outer longitudinal wall. A recess 72 is provided in the dividing insert 7 for each of the three inner webs 53 of the receiving frame 5 which can be seen. Again, the downwardly offset retaining ridge 54 of the central inner web 53 may help to minimize the risk of the dividing insert 7 falling out when the receiving frame 5 moves.

Figure 18:
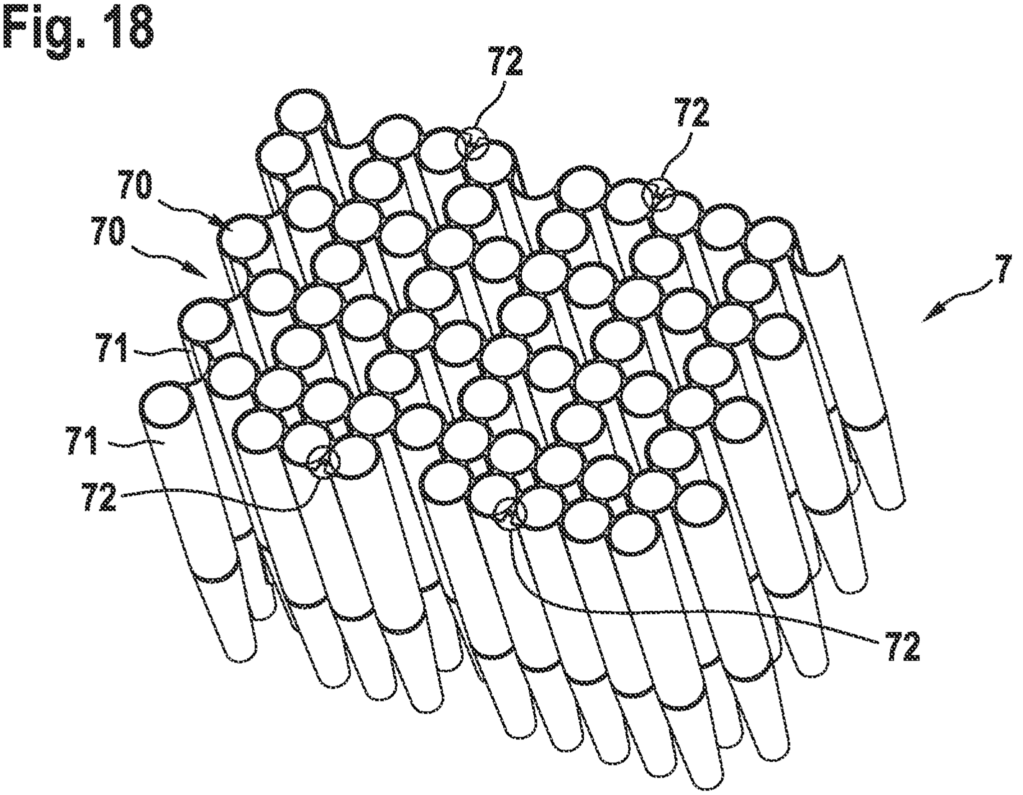
FIG. 18 shows an overview view of a dividing insert of the first embodiment.

FIG. 18 shows a single dividing insert 7 according to the first embodiment of FIG. 14. The possible arrangement of hollow cylinders and half hollow cylinders for forming the receiving openings 70 can clearly be seen in this case. The recesses 72 in the dividing insert 7, which are arranged on its upper side, can also be seen well. In this embodiment, the dividing insert 4 comprises such recesses 72, the position and arrangement of which are adapted to the position and arrangement of retaining ridges 54 in the receiving frame 5 as shown in FIG. 14. Moreover, in FIG. 19, a possible shape of the dividing walls 71 is shown, which in this case is adapted to the external shape of pipette tips 6. For this purpose, the hollow cylinders have a conically tapering part on their side facing the lower side of the receiving frame 5 (when inserted in a receiving frame 5).

FIG. 19 shows a single dividing insert 7 according to the second embodiment of FIG. 16. The dividing walls 71 are such that each receiving opening 70 is formed by two transverse walls and two longitudinal walls as previously described with respect to FIGS. 16 and 17.

The recesses 72 at six contact points of a transverse wall on each outer longitudinal wall, which are adapted in height to the presence of retaining ridges on the longitudinal walls 51 of a receiving frame 5, are clearly shown here. In any embodiment of the dividing insert 7 or the receiving frame 5, it is possible that such structures for retaining a dividing insert 7 in a receiving frame 5 are mutually adapted to each other. The recesses 72 may be bounded by U-shaped connecting walls towards the lower side and open connecting walls towards the outside. For example, inner webs 53 of the receiving frame 5 can project into the formed channel and thus stabilize the position of the dividing insert 7 in the interior space 60 of the receiving frame 5. Functionally equivalent shapes but deviating from a U-shape, such as a V-shape, semi-circular or the like are correspondingly also possible.

Figure 20:
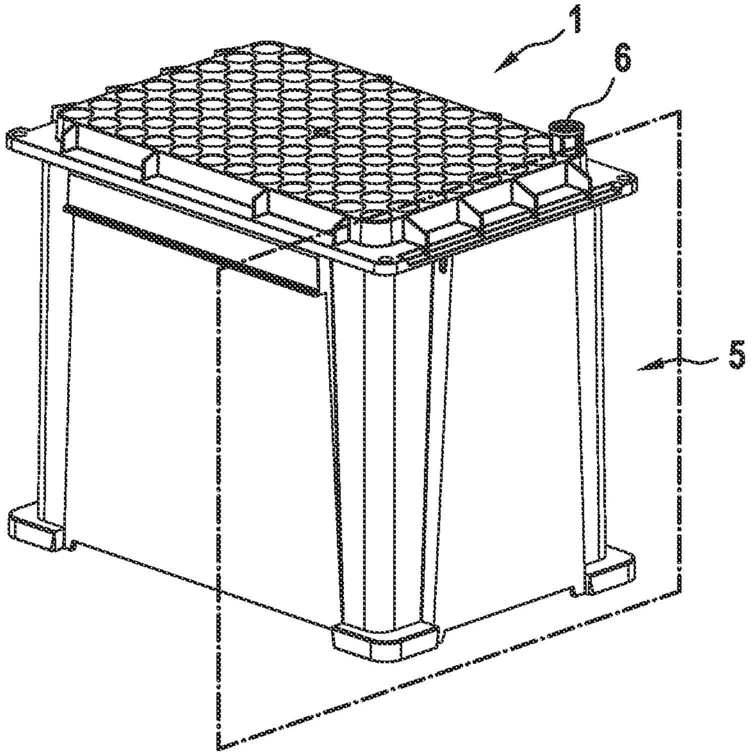
FIG. 20 shows a highly schematized overview drawing of an assembly comprising a receiving frame and an attached variant of a support plate for pipette tips of the first embodiment.

FIG. 20 shows a highly schematized overview drawing of an assembly having a receiving frame 5 and a variant of a support plate 1 for pipette tips of the first embodiment placed thereon. An exemplary inserted pipette tip 6 is shown in this support plate 1. The assembly also comprises a dividing insert 7 of a first embodiment, as can be seen in detail in FIG. 21.

Figure 21:
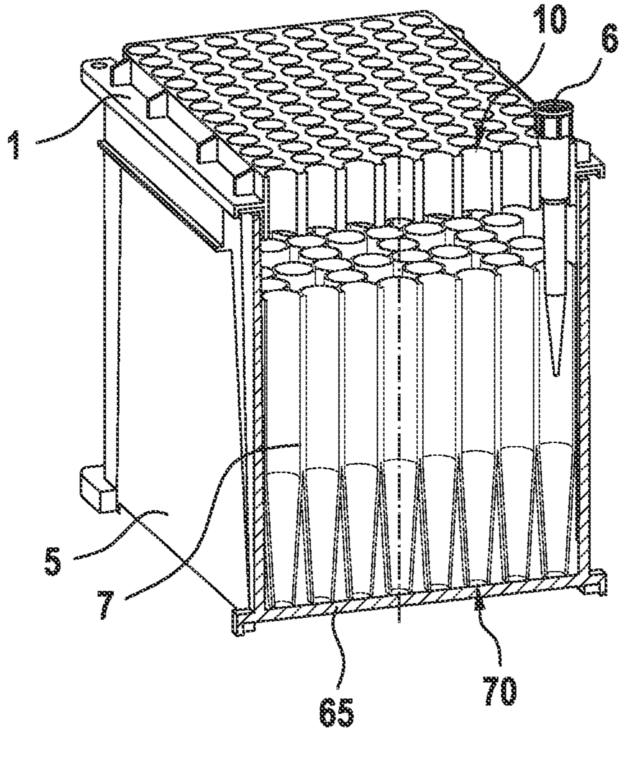
FIG. 21 shows a schematic cross-section in a three-dimensional view through the assembly of FIG. 20.

FIG. 21 shows a schematic cross-section in a spatial view through the assembly of FIG. 20 along the indicated sectional plane. It can be clearly seen here, on the one hand, how a dividing insert 7 is positioned in the interior space 60 of the receiving frame 5, and how a pipette tip projecting into a storage opening 10 of the attached support plate 1 of the first embodiment projects into the dividing insert 7, respectively into a receiving opening 70 of the dividing insert 7. The receiving openings 70 of the dividing insert 7 are thereby longer than the length of the pipette tip 6 by which it projects into the receiving frame. In this way, the part of an inserted pipette tip 6 which projects into the receiving frame 5 is almost completely positioned in the dividing insert 7. In this case, the dividing insert 7 rests on a present base plate 65.

It can also be seen how the support plate 1 rests on the upper edge of the receiving frame 5 with the lower side of its structures surrounding the base plate.

Figure 22:
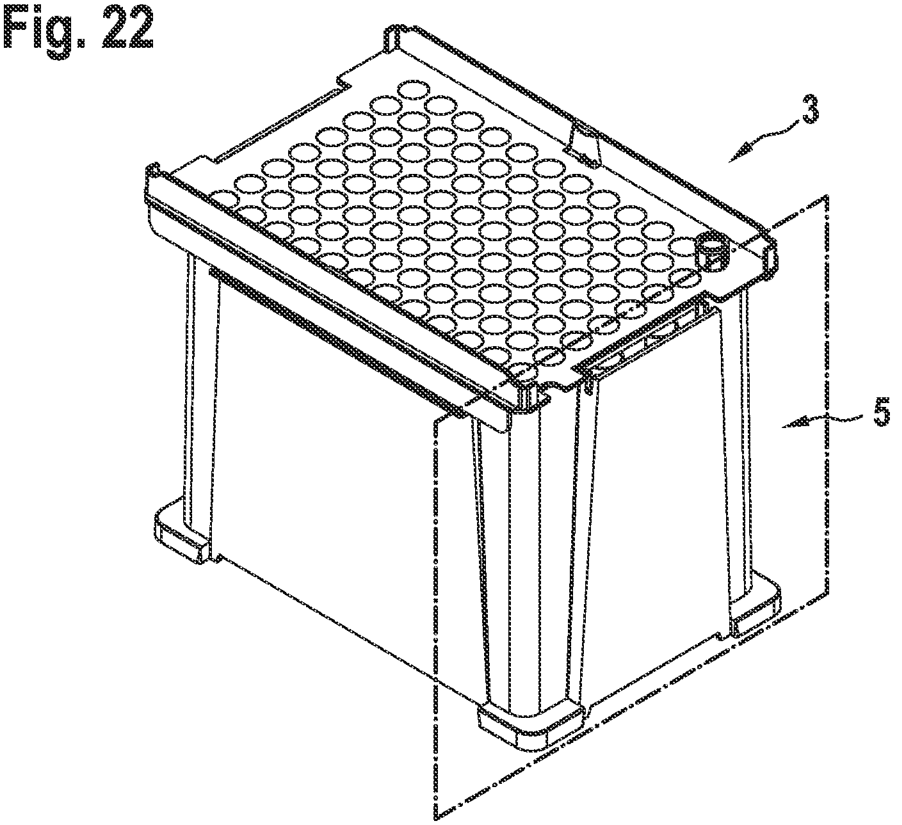
FIG. 22 shows a highly schematized overview drawing of an assembly comprising a receiving frame and an attached support plate for pipette tips of the second embodiment.

FIG. 22 shows a highly schematized overview drawing of an assembly having a receiving frame 5 and an attached support plate 1 for pipette tips of the second embodiment. An exemplary inserted pipette tip 6 is shown in this support plate 1. The assembly also comprises a dividing insert 7 of a second embodiment, as can be seen in detail in FIG. 23.

Figure 23:
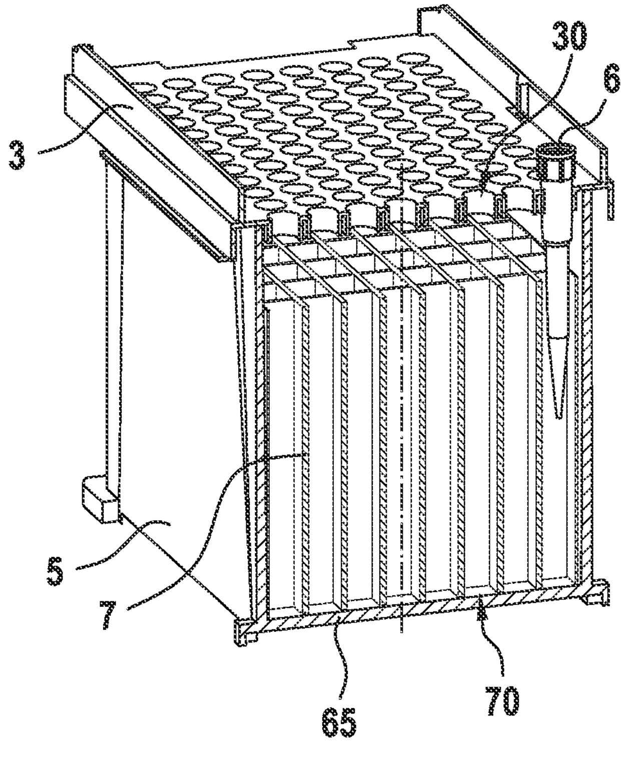
FIG. 23 shows a schematic cross-section in a three-dimensional view through the assembly of FIG. 22.

FIG. 23 shows a schematic cross-section in a spatial view through the assembly of FIG. 22 along the indicated sectional plane. It can be clearly seen here, on the one hand, how a dividing insert 7 is positioned in the interior space 60 of the receiving frame 5, and how a pipette tip inserted into a storage opening 30 of the mounted support plate 3 of the second embodiment projects into the dividing insert 7, or into a receiving opening 70 of the dividing insert 7, respectively. The dividing insert 7 also rests here on a base plate 65.

In particular, it can be derived from FIGS. 21 and 23 that the height H of the receiving frame 5 should be adapted to the pipette tips 6 to be inserted. Moreover, the height of the dividing insert 7 and also the dimension of the receiving openings 70 in this dividing insert 7 can be adapted to the dimensions of the pipette tips 6 to be inserted. In particular, it may be provided that the dividing insert 7 is configured in such a way that the longitudinal axis of its receiving openings 70 lies on the longitudinal axis of the storage openings 10, 30 of the support plate 1, 3 used for pipette tips when the dividing insert 7 is inserted in the corresponding receiving frame 5.

Figure 24:
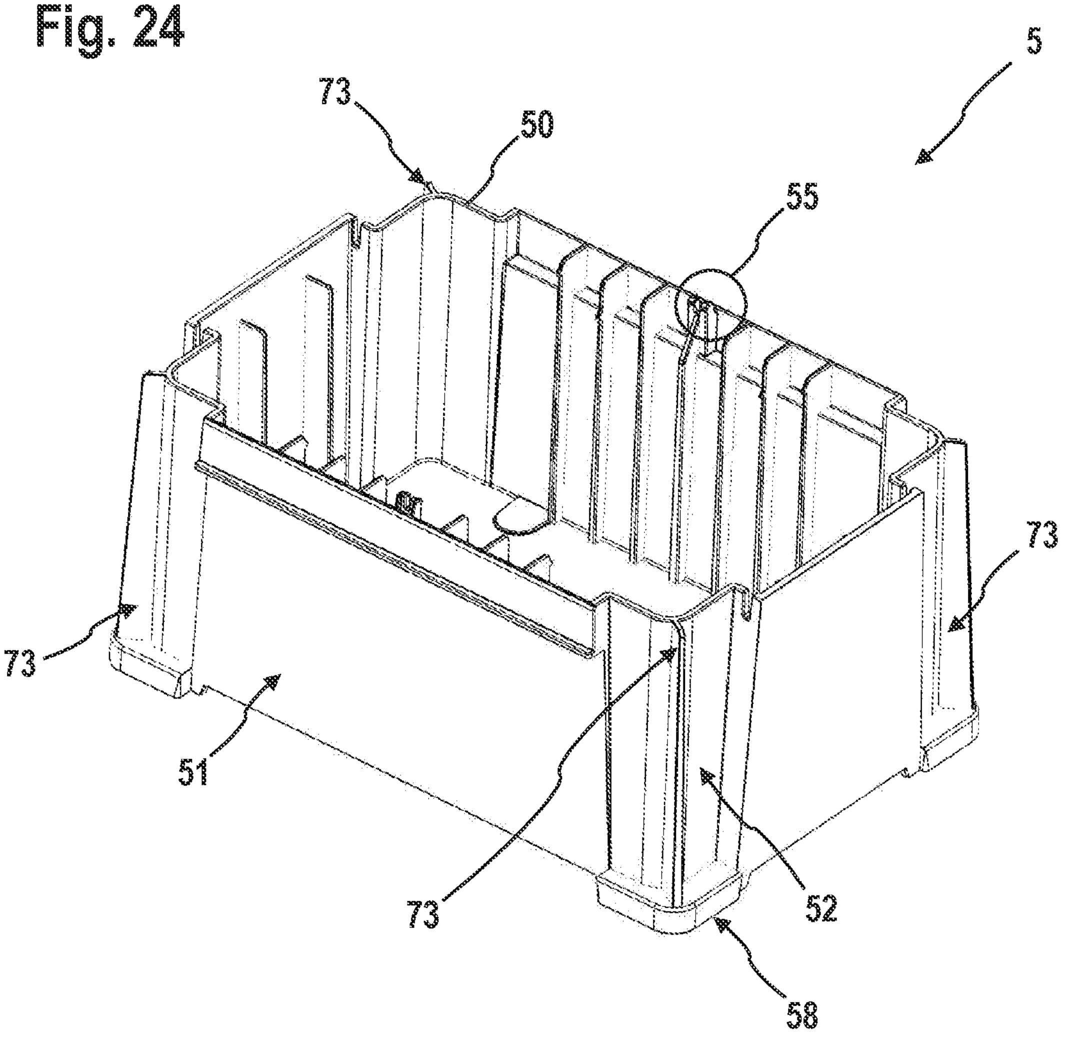
FIG. 24 shows a receiving frame in a further, alternative embodiment in a schematic view obliquely from above.

FIG. 24 is a schematic view from above on a receiving frame 5 in a further embodiment. The receiving frame 5 shown is very similar to the receiving frame 5 shown in FIG. 1, despite the fact that it is comparably shorter, thus having a smaller height H. In this "shortened" embodiment the receiving frame 5 is particularly suited for receiving shorter pipette tips 6, for example pipette tips 6 which are configured for a precise pipetting of 200 μl or 100 μl or less. In contrast to this, a higher embodiment of the receiving frame 5 may be particularly suitable for receiving pipette tips 6 which are configured for larger volumes up to 1000 μl.

The advantage of receiving frames 5 which are suitable for shorter pipette tips 6 is that they may be used together with a so-called spacer, using which multiple support plates may be stacked on top of each other (not shown).

The receiving frame 5 shown here comprises in total four external fins 73 arranged at an outer side. In each case one external fin 73 is arranged on one corner of the receiving frame 5. An external fin 73 extends here along the complete height h of the receiving frame (compare FIG. 1) and ends flush with the support surface 50 for a support plate. The upper side of the external rips thereby form a star-like radiating extension of the support surface 50. It is the advantage of such external fins 73 that the additionally contribute to the stability, for example in case a 96 pipetting head is pressed onto the pipette tips 6 which are inserted into a support plate placed on the receiving frame 5, or in case when such pipette tips are attached in a row to a multichannel pipetting arm, and the forces are applied asymmetrically onto a support plate. By means of external fins 73 positioned according to FIG. 24, in particular the corners of a support plate placed on a receiving frame 5 may be supported in this situation, and a deformation of the support plate may be minimized or even prevented.

The number and arrangement of external fins 73 may be adapted to the geometrical particularities, as well as the elements described previously.

LIST OF REFERENCE SIGNS

| | |
|---|---|
| 1 | Support plate of a first embodiment |
| 3 | Support plate of a second embodiment |
| 5 | Receiving frame |
| 6 | Pipette tip |
| 7 | Dividing insert for pipette tips |
| 8 | Gripper |
| 10 | Storage opening of 1 for pipette tips |
| 11 | Retaining lug |
| 12 | Centering opening |
| 13 | Web receptacle |
| 14 | Engagement surface for gripper arm |
| 15 | Reinforcing struts |
| 16 | Support surface for SBS receiving box |
| 17 | Base plate |
| 30 | Storage opening of 3 for pipette tips |
| 31 | Lateral recess |
| 32 | Orientation web |
| 33 | Orientation channel |
| 34 | Engagement surface for gripper arm |
| 35 | Recess for positioning pin |
| 36 | Recess |
| 37 | Support surface |
| 38 | Base plate |
| 50 | Support surface for support plate |
| 51 | Longitudinal wall |
| 52 | Transverse wall |
| 53 | Inner web |
| 54 | Retaining ridge |
| 55 | Guide claw |
| 56 | Guide slot |
| 58 | Footprint |
| 59 | Protrusion from 52 |
| 60 | Interior space |
| 61 | Spacer web |
| 62 | Transverse web |
| 63 | Gripper edge |
| 64 | Protrusion from 51 |
| 65 | Base plate |
| 66 | Claw of the guide claw |
| 67 | Guide of the guide claw |
| 68 | Base of the guide claw |
| 70 | Receiving opening |
| 71 | Dividing wall |
| 72 | Recess |
| 73 | external fin |
| H | Height |

The invention claimed is:

1. A receiving frame (5) for a support plate (1, 3) for pipette tips (6), which is formed by two opposing longitudinal walls (51) and two opposing transverse walls (52), which each comprise an upper side and a lower side and which laterally enclose an interior space (60), wherein the upper sides of the longitudinal walls (51) and transverse walls (52) together form a circumferential support surface (50) on which the support plate (1, 3) for pipette tips (6) can be placed, and wherein the receiving frame (5) comprises a footprint (58) on the lower side of the longitudinal walls (51) and the transverse walls (52), characterized in that the receiving frame (5) comprises, on an inner side of at least one of the two opposing longitudinal walls (51), a guide claw (55) which—for the alternative positioning of two different support plates (1, 3) on the support surface (50)—protrudes over the at least one longitudinal wall (51) and thus over the support surface (50), wherein the guide claw (55) comprises a base (68) on which two claws (66) are arranged spaced apart from each other in the direction parallel to the support surface (50) by a guide (67), wherein the guide (67) is a recess which, starting from an upper side of the two claws (66), extends substantially at a right angle relative to the support surface (50).

2. The receiving frame (5) according to claim 1, characterized in that it comprises two guide claws (55), wherein one guide claw is arranged on each longitudinal wall (51), and both guide claws (55) face each other.

3. The receiving frame (5) according to claim 1, characterized in that one or both of the two claws (66) are pin-shaped for positioning a support plate (1,3) for pipette tips, or in that one or both claws (66) comprise a hook structure for reversibly holding a support plate (3) for pipette tips.

4. The receiving frame (5) according to claim 1, characterized in that the two claws (66) of the guide claw (55) are fixed to the inner side of one of the at least one of the two opposing longitudinal walls (51) via a common base (68), wherein the common base (68) is spaced from the inner side of the one of the at least one of the two opposing longitudinal walls (51), or wherein the common base (68) is substantially connected to the inner side of the one of the at least one of the two opposing longitudinal walls (51).

5. The receiving frame (5) according to claim 1, characterized in that it comprises, on at least one transverse wall (52), a protrusion (59) comprising two guide slots (56), wherein the guide slots (56) are arranged in alignment with one another which extends parallel to the transverse wall (52).

6. The receiving frame (5) according to claim 1, characterized in that each of the longitudinal walls (51) comprises on its inner side an inner web (53) which comprises at least one retaining ridge (54) arranged towards an upper side of the receiving frame (5) and projecting in the direction of the interior space (60), wherein the at least one retaining ridge (54) is adapted to reversibly retain a retaining lug (11) of an attached support plate for pipette tips (1) of a first embodiment.

7. The receiving frame (5) according to claim 6, characterized in that it comprises, on each longitudinal wall (51), a guide claw (55) having two sides and two inner webs (53), each having a retaining ridge (54), wherein one of the two inner webs (53) is arranged on one side of the guide claw (55) and the other one of the two inner webs (53) is arranged on an opposite side of the guide claw (55).

8. The receiving frame (5) according to claim 1, characterized in that it comprises a U-shaped protrusion (64) on both longitudinal walls (51).

9. The receiving frame (5) according to claim 1, characterized in that it comprises a base plate (65) connected to the longitudinal walls (51) and/or the transverse walls (52).

10. The receiving frame (5) according to claim 1, characterized in that it comprises a dividing insert (7), wherein the dividing insert (7) comprises a plurality of dividing walls (71) forming a plurality of receiving openings (70) for pipette tips (6).

11. The receiving frame (5) according to claim 10, characterized in that it comprises, on an inner side of at least one of the two opposing the longitudinal walls (51) or on an inner side of at least one of the two opposing the transverse walls (52), an inner web (53) which comprises a retaining ridge (54) projecting in the direction of the interior space (60), wherein the retaining ridge (54) is configured to act on the dividing insert (7) in a reversibly retaining manner.

12. The receiving frame (5) according to claim 10, characterized in that the dividing insert (7) is formed of a plurality of dividing walls (71) forming the receiving openings (70) for pipette tips (6), wherein a receiving opening formed by one or more dividing walls (71) is dimensioned to receive one or more pipette tips (6).

13. The receiving frame (5) according to claim 10, characterized in that the dividing walls (71) are longitudinal and transverse walls extending substantially parallel to the longitudinal walls (51) or transverse walls (52), or in that the dividing walls are cylindrical hollow bodies extending from a lower side of the receiving frame (5) in the direction towards an upper side thereof.

14. The receiving frame (5) according to claim 1, comprising at least one external fin (73), which is arranged at an outer side of a longitudinal wall (51) and/or an outer side of a transverse wall (52) and/or an outer side of a frame corner, wherein the external fin (73) ends flush with the support surface (50).

15. A method of presenting pipette tips (6), comprising the following steps:

providing a receiving frame (5) according to claim 1, providing a support plate for pipette tips of a first embodiment (1) comprising at least one reinforcing strut (15) on a lower side of the support plate for pipette tips of the first embodiment (1) and a plurality of retaining lugs (11), and providing a support plate for pipette tips of a second embodiment (3), which comprises at least one recess on a longitudinal side of the support plate for pipette tips of a second embodiment (3), selecting either the support plate for pipette tips of the first embodiment (1) or the support plate for pipette tips of the second embodiment (3), and positioning and holding the selected support plate (1,3) on the receiving frame (5) by means of the guide claw (55).

* * * * *